US011886906B2

(12) United States Patent
Dong et al.

(10) Patent No.: US 11,886,906 B2
(45) Date of Patent: Jan. 30, 2024

(54) DYNAMICAL SWITCHING BETWEEN EPT AND SHADOW PAGE TABLES FOR RUNTIME PROCESSOR VERIFICATION

(71) Applicant: Intel Corporation, Santa Clara, CA (US)

(72) Inventors: Chuanxiao Dong, Beijing (CN); Yaozu Dong, Shanghai (CN); Zhiyuan Lv, Beijing (CN); Zhi Wang, Kangasala (FI)

(73) Assignee: Intel Corporation, Santa Clara, CA (US)

( * ) Notice: Subject to any disclaimer, the term of this patent is extended or adjusted under 35 U.S.C. 154(b) by 315 days.

(21) Appl. No.: 17/343,078

(22) Filed: Jun. 9, 2021

(65) Prior Publication Data

US 2021/0294636 A1    Sep. 23, 2021

Related U.S. Application Data

(63) Continuation of application No. 16/333,987, filed as application No. PCT/CN2019/075811 on Feb. 22, 2019, now Pat. No. 11,048,542.

(51) Int. Cl.
*G06F 9/455* (2018.01)
*G06F 9/48* (2006.01)

(52) U.S. Cl.
CPC ......... *G06F 9/45558* (2013.01); *G06F 9/485* (2013.01); *G06F 2009/45583* (2013.01); *G06F 2009/45591* (2013.01)

(58) Field of Classification Search
CPC ....... G06F 9/45558; G06F 2009/45583; G06F 2212/1016; G06F 12/1036;
(Continued)

(56) References Cited

U.S. PATENT DOCUMENTS 9,389,895 B2 * 7/2016 Oshins .................. G06F 3/0647
10,114,759 B2 * 10/2018 Amit .................... G06F 12/1009
(Continued)

OTHER PUBLICATIONS

International Search Report and Written Opinion for International Application No. PCT/CN2019/075811, dated Nov. 28, 2019, 10 pages.
(Continued)

*Primary Examiner* — Beemnet W Dada
(74) *Attorney, Agent, or Firm* — Nicholson De Vos Webster & Elliott LLP

(57) ABSTRACT

Implementations disclosed describe a system and a method to execute a virtual machine on a processing device, receive a request to access a memory page identified by a guest virtual memory address (GVA) in an address space of the virtual machine, translate the GVA to a guest physical memory address (GPA) using a guest page table (GPT) comprising a GPT entry mapping the GVA to the GPA, translate the GPA to a host physical address (HPA) of the memory page, store, in a translation lookaside buffer (TLB), a TLB entry mapping the GVA to the HPA, modify the GPT entry to designate the memory page as accessed, detect an attempt by an application to modify the GPT entry; generate, in response to the attempt to modify the GPT entry, a page fault; and flush, in response to the page fault, the TLB entry.

20 Claims, 15 Drawing Sheets

(58) Field of Classification Search
CPC ..... G06F 2009/45587; G06F 2212/151; G06F 2212/152; G06F 2212/154
See application file for complete search history.

(56) References Cited

U.S. PATENT DOCUMENTS

| | | | |
|---|---|---|---|
| 10,394,596 B2* | 8/2019 | Tsirkin | G06F 9/5016 |
| 10,853,259 B2* | 12/2020 | Das | G06F 12/1009 |
| 10,997,083 B2* | 5/2021 | Blake | G06F 12/1009 |
| 11,048,542 B2* | 6/2021 | Dong | G06F 12/1036 |
| 11,281,481 B2* | 3/2022 | Abdallah | G06F 9/4552 |
| 2007/0214340 A1 | 9/2007 | Leveille et al. | |
| 2010/0250869 A1 | 9/2010 | Adams et al. | |
| 2014/0379955 A1 | 12/2014 | Dong et al. | |
| 2014/0379956 A1 | 12/2014 | Chang et al. | |
| 2017/0357592 A1 | 12/2017 | Tarasuk-Levin et al. | |
| 2018/0157596 A1 | 6/2018 | Amit | |
| 2018/0365163 A1 | 12/2018 | Das | |

OTHER PUBLICATIONS

Notice of Allowance, U.S. Appl. No. 16/333,987, dated Feb. 22, 2021, 09 pages.
International Preliminary Report on Patentability, PCT App. No. PCT/CN2019/075811, dated Sep. 2, 2021, 6 pages.
Notice of Intention to Grant, GB App. No. 2110580.4, dated Jul. 28, 2022, 2 pages.

\* cited by examiner

DYNAMICAL SWITCHING BETWEEN EPT AND SHADOW PAGE TABLES FOR RUNTIME PROCESSOR VERIFICATION

RELATED APPLICATIONS

The present application is a continuation of U.S. patent application Ser. No. 16/333,987, filed on Mar. 15, 2019, entitled "DYNAMICAL SWITCHING BETWEEN EPT AND SHADOW PAGE TABLES FOR RUNTIME PROCESSOR VERIFICATION", which is hereby incorporated herein by this reference in its entirety and for all purposes. U.S. patent application Ser. No. 16/333,987 is itself a U.S. National Phase Application under 35 U.S.C. § 371 of International Application No. PCT/CN2019/075811, filed Feb. 22, 2019, entitled "DYNAMICAL SWITCHING BETWEEN EPT AND SHADOW PAGE TABLES FOR RUNTIME PROCESSOR VERIFICATION".

TECHNICAL FIELD

The disclosure pertains to computer systems; more specifically, to enabling dynamical switching between extended page tables and shadow page tables for runtime processor verification.

BACKGROUND

Modern processing devices have to meet constantly increasing expectations of users regarding security of their data. Attempts of unauthorized persons to gain access to sensitive data stored in memory and processors can be facilitated by a variety of techniques including software and hardware-based bus scanning, memory scanning, hardware probing, hardware Trojans, and the like to retrieve data from processing devices. This data could include, for example, privacy-sensitive data, IP-sensitive data, encryption keys used for secure storage or communication, and so on. The exposure of data is further exacerbated with the current trend of moving data and enterprise workloads into the cloud using virtualization-based hosting services provided by cloud service providers. In such environments, allowing unauthorized access to hardware and the data stored therein can endanger security of a large number of users.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
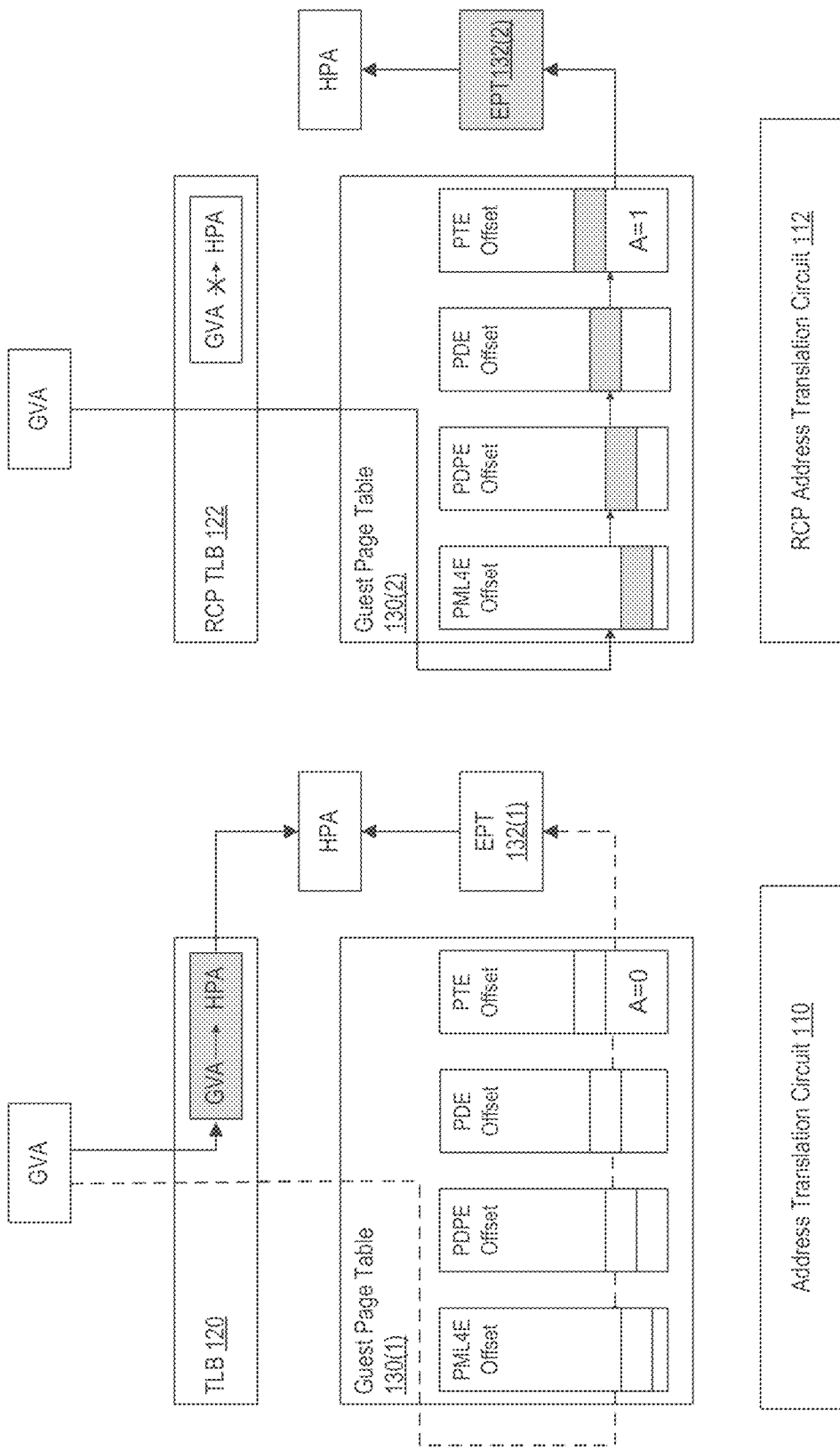
FIG. 1 schematically illustrates a difference in the execution states of the main processor (left) and the replay co-processor (right) arising from differences in the content of their translation lookaside buffers.

Aspects of the present disclosure are directed at enabling periodic verification of a main processor and its execution state by a replay co-processor (RCP). A processor checking module (PCM) may perform periodic sampling of the architecturally-visible state of the main processor (e.g., its registers) and memory used by the main processor to execute instructions, such as a guest operating system (GOS) and/or a software stack for a virtual machine (VM), and replay these instructions on the RCP in order to compare the resulting execution state of the main processor to that of the RCP. To speed up and optimize the replay process, the main processor may switch back and forth between the main memory access mode, which uses guest page tables and extended page tables, to the replay memory access mode, which uses shadow page tables, as explained in more detail herein below.

Virtual computing environments provide computing resources and data storage resources for various devices. Remote computing and data storage make it especially important to protect data from access by unauthorized persons and malicious software. In some instances, unauthorized access may be gained through a hardware Trojan, such as a physical modification of the processor circuitry, or a hardware scanning device that transmits data and instructions executed by the processor (e.g., by radio emission or via a network). The presence of a hardware Trojan may be detected by physical inspection, checksum testing, analysis of the electromagnetic activity of the circuit, and so on. Such testing may be difficult to perform where a large number of processing devices is involved.

Various implementations described in the present disclosure address the need to secure a processor of a computing system, e.g., a virtualization server, from hardware Trojans. The disclosed implementations may also be used for establishing that the processor of a computing system behaves as documented and that no inadvertent errors have crept in during processor design, manufacturing, or runtime execution. In some implementations, a co-processor may be used for verification of the execution state of the main processor. A main processor, affected by a hardware Trojan, may not be able to execute instructions in the same way as a processor free from Trojan interference does. For example, a hardware Trojan may be purposefully attempting to modify the execution state of the main processor: in some situations a Trojan may prevent the main processor from executing some instructions whereas in other situations a Trojan may attempt to steer the main processor to execute additional instructions. In both types of situations, the main processor—after some time has elapsed— may end up with different content of registers, cache, and translation lookaside buffer (TLB) as compared to a healthy (Trojan-free and/or error-free) processor. Likewise, a Trojan-affected main processor may cause a different memory state to occur than a healthy processor would have caused. Moreover, even a Trojan whose purpose is to simply "spy" on the main processor without actively modifying its operations may not be able to do so in all instances. For example, a small but nonetheless always present physical (e.g., electric) coupling to the main processor—necessary to observe its operations—may occasionally disrupt instruction execution (e.g., a gate operation) and result in a different execution state of the main processor and/or the memory state.

An identical—to the main processor—RCP may be used in some implementations for instruction-by-instruction comparison of the execution state of the main processor. This, however, may lead to a prohibitively high cost of verification if the main processor is a state-of-the art device. But even where the cost is not an issue, the identical co-processor may suffer from the same Trojan interference if both processors are produced by the same manufacturing process on the same production line. Avoiding such problems may be achieved if a cheaper RCP is used for verification of only a certain subset of sequences of instructions executed by the main processor. An RCP may be a "trusted" processor whose production may be carefully monitored to ensure its security. The RCP may be a non-X86 architecture processor. In some implementations, a detailed architecture of the RCP may be published to prove that it is "trusted" processor. As a way of example, an RCP may replay only instructions associated with a virtual processor enabled by the main physical processor for a certain virtual machine supported by the virtualization server being executed by the main processor. An RCP—even if slower than the main processor—may sample the memory and the execution state of the virtual processor for a limited time, but repeatedly. As an illustration, sampling may occur every 1 second for 0.1 of a second. Namely, at the start of a 0.1 sec verification time interval, a processor state (e.g., its execution context) of a virtual processor may be copied for the subsequent execution of the copied processor state on the RCP. The processor state may include the architecturally-visible state of the processor (e.g., its registers), the memory, and input-output (I/O) state of the virtual machine associated with the virtual processor. At the end of the 0.1 sec verification time interval, the new processor state of the virtual processor may be copied and stored for eventual verification against the processor state of the RCP when the RCP completes the replay execution. Subsequently, the replay execution by the RCP may start. In some implementations, where the RCP has a different architecture than the main processor (e.g., the main processor may be a X86 processor whereas the RCP may be a non-X86 processor), there may be an additional firmware that runs on an instruction emulator in order to make sure that the RCP can execute instructions captured from the main processor. The firmware may monitor if the verification time interval has completed. Once it is completed, the firmware may take the initial processor state, the memory state, and the input-output (I/O) state, which was captured at the beginning of the time verification interval and creates a virtual processor (e.g., a virtual X86 processor) that may include a virtual MMU, a virtual TLB, and a virtual cache for use in replay processing. During the replay processing, the instructions captured during the verification time may be executed one by one on this RCP virtual processor. In some instances, the RCP may take significantly longer than 0.1 sec to replay the processor state of the main processor (or one of its virtual processors), e.g. it may take close to a full second. In some implementations, the execution by the RCP may begin to run concurrently with the execution of the virtual processor, prior to the end of the verification time interval. Once the RCP has completed the replay execution, the processor state of the RCP at an end of the replay execution may be compared with the processor state and the modified memory of the main processor at the end of the verification time interval. If a hardware Trojan has interfered with the execution by the main processor, such comparison may detect the Trojan's presence. Even if the Trojan has been silent during the 0.1 sec verification time interval, the replay verification may be repeated at the beginning of a new 1 sec time period. Consequently, after a number of such replay verifications, the RCP may eventually detect the likely presence of the Trojan and mark the main processor for closer examination, e.g., by one of the conventional methods referenced above.

A significant obstacle to such periodic verification may be that not the entire state of the main processor may be available for copying. In some implementations, the content of the main processor TLB may be architecturally-invisible per manufacturer's policies and/or designs. Because TLB optimizes memory address translations, inability to copy the TLB may result in a different memory state of the RCP replaying and the main processor execution, as illustrated by FIG. 1.

FIG. 1 schematically illustrates a difference in the execution states of the main processor (left) and the replay co-processor (right) arising from differences in the content of their translation lookaside buffers. To enable virtual memory implementations, the memory may store guest page tables (GPT) 130 and extended page tables (EPT) 132 to translate virtual memory addresses to physical memory addresses. For example, an application (e.g., GOS or a software program executed therein) may reference a guest virtual address (GVA), when executing a memory access transaction. In response, the address translation circuit 110 of the main processor may perform a page walk (depicted by a dashed line in the left panel) in the guest page table 130(1) to identify a guest physical address (GPA) associated with the referenced GVA. To identify the host physical memory address (HPA) for the determined GPA, the address translation circuit 110 may perform another page walk in the EPT 132(1).

In some implementations, the guest physical address (GPA) may be broken into a series of offsets, each to search within a table structure of a hierarchy of the GPT entries. In this example, the GPT 130(1) includes a four-level hierarchal table of entries, including a page map level 4 entry (PML4E), a page directory pointer table entry (PDPE), a page directory entry (PDE), and a page table entry (PTE). (In other implementations, a different number of levels of hierarchy may exist within the GPT, and therefore, the disclosed implementations are not to be limited by a particular implementation of the GPT.) A result of each search at a level of the GPT hierarchy may be added to the offset for the next table to locate a next result of the next level table in the GPT hierarchy. A similar hierarchical structure (not shown explicitly in FIG. 1) may be implemented in the EPT 132(1). The result of the page walk in GPT 130 and EPT 132 may be a page offset to locate a 4 Kb page (for example) in physical memory, which is the HPA. When a processor performs a page walk to obtain such GVA→HPA translation, it may set an "accessed" bit A=1 in the GPT entry for the GVA designating the physical memory address identified by the GVA as accessed. The GOS may monitor the status of the A-bits of its various addresses to keep track of how frequently different memory pages are accessed by the software operating in the virtual machine. The GOS may periodically flush the A-bit (e.g., assigning to it the value A=0) and observe how quickly the A-bit will be set again.

The TLB 120 of the main processor may store a number of recent GVA→HPA memory translations to speed-up subsequent memory transactions if the same GVA is referenced again by GOS of the software executed on the virtual machine. For example, as shown by the solid line on the left panel, if a new request for a memory page associated with the GVA is made, the address translation circuit 110 will first look for a recent GVA→HPA translation in the TLB 120. If the translation is not stored in the TLB 120 (a "TLB miss"), the processor will walk the GPT 130(1) and the EPT 132(1) to obtain the HPA. But if the translation is found within the TLB 120 (a "TLB hit"), the processor will recover the GVA→HPA translation directly from the TLB 120 and refrain from walking the page tables again.

As a result, the following situations may occur, where
(1) a first request for a GVA is made;
(2) the processor walks the GPT and the EPT to obtain the GVA→HPA translation;
(3) the processor sets the A-bit in the GPT: A=1;
(4) the processor stores the GVA→HPA translation in the TLB;
(5) the GOS resets (clears) the A-bit in GPT: A=0;
(6) a second request for the GVA is made;
(7) the processor recovers the corresponding HPA from the TLB without walking the page tables, so that the A-bit remains clear: A=0.

Such situations can potentially result in inconsistencies between the execution states of the main processor and the RCP and result in false-positive indications of Trojan interference even for a perfectly healthy main processor. This may happen, for example, if the start of the verification time interval falls after the step (5), so that the A-bit is cleared from GPT 130(1) while a valid translation is stored in the TLB 120. When the PCM produces a GPT copy 130(2) of the GPT 130(1)—as well as an EPT copy 132(2)—and makes the GPT copy 130(2) available to the RCP, the A-bit in the corresponding GPT entry is clear, A=0. Because the TLB 120 behavior emulation may not be publically disclosed by the manufacturer of the processor, the content of the TLB 120 may not be architecturally visible. Accordingly, the content of the TLB 120 may not be copied at the beginning of the verification time period and the RCP TLB 122 may not strictly emulate the exact behavior of the TLB 120. In such instances, the RCP processor may have to begin verification with an empty RCP TLB 122 or, at least with the RCP TLB 122 whose content is different from that of the TLB 120. Accordingly, when the main processor and the RCP processor are to execute an instruction to access the memory page associated with the same GVA, the address translation circuit 110 of the main processor may recover the GVA→HPA translation from its TLB 120. On the other hand, the address translation circuit 112 of the RCP may not find this translation in the RCP TLB 122 and, therefore, will have to perform a page walk, as shown by a solid line in the right panel of FIG. 1. As a result, the memory state of the two execution contexts—of the main processor and the RCP—will be different, as the A-bit will be set in the RCP copy of the GPT 130(2) but remain clear in the GPT 130(1) used by the main processor. If the software does not clear the A-bit again prior to the end of the verification time interval, this difference in the A-bit may result in a false-positive determination that the main processor may be experiencing an outside interference.

A simple solution to this problem could be to ensure that the GOS flushes the TLB 120 whenever the GOS clears the A-bit for one of its GPT entries. But in virtualization environments, the GOS may commonly be outside the Trusted Computing Base of the virtualization server and lack the kernel-level authorization to issue instructions to clear or invalidate the TLB 120. Furthermore, because the GOS may belong to any of a number of operating systems available on the commercial market, it would be very difficult or nearly impossible to modify all such operating systems to ensure proper TLB invalidation. Moreover, ensuring safety against hardware Trojans at the price of granting access to the processor by untrusted commercial software may not be a viable solution, from the security standpoint.

A different approach may be to utilize shadow page tables (SPT). A shadow page table may store direct translations GVA→HPA unlike the translations illustrated in FIG. 1, where GVA→GPA translations are stored in the GPT 130 and GPA→HPA translations are stored in the EPT 132. A hypervisor/virtual machine monitor (VMM) may populate the SPT with direct GVA→HPA translations. The SPT may be used to write-protect the GPT. In some implementations, a GPT memory page may store the GPT or some part of the GPT. The GPT memory page may be a physical page. The GPT memory page may be designated as write-protected. For example, a protected bit may be set in the GVA→HPA memory translation identifying the GPT memory page. When the GOS, or an application running inside the VM attempts to modify a GPT entry stored in the GPT memory page, the VM may execute instructions to access and modify the GPT memory page. Because, in some implementations, the VM may only be able to refer to the GPT memory page by its GVA address, the processor (or its MMU) may have to walk the SPT to determine the HPA of the GPT memory page. The MMU may detect that the GPT memory page is write-protected (e.g., by detecting that a write-protect bit is set), and generate a page fault. The page fault may trigger a VM-exit. A VM-exit may be a hardware event (e.g., an exception, interrupt, or fault), triggered by an invalid or prohibited operation, and causing the transfer of the execution control from an active VM to the VMM. Upon the VM-exit, the VMM takes over the main processor (or a virtual processor assigned to the VM), and may remap the SPT using the changes made (or attempted to be made) by the GOS to the GPT, so that GVAs in the GPT are consistent with GVAs in the SPT. The trusted VMM may also flush the TLB 120 so that the A=0 state of the GPT entry is always correlated with the absence of the corresponding translation in the TLB 120. But such SPT-enabled memory access mode may have significant disadvantages compared with the EPT-enabled memory access mode of FIG. 1. Because for each VM the VMM would have to map GVAs directly to HPAs and maintain as many SPTs as there are processes in each VM—as opposed to maintaining one EPT supporting many processes in one VM—the SPT-mode is significantly more cumbersome and less efficient than the EPT-mode. The efficiency of the SPT-mode is reduced even further because of the need to update SPT to reflect the changes made to the GPT changes.

As described below, in some implementations, a dynamic switching between the EPT-mode and SPT-mode of memory accesses may provide a right compromise between fast execution characteristic of the EPT-mode and the A-bit/TLB synchronization enabled in the SPT-mode. Aspects of the present disclosure describe how, in one implementation, the PCM or the VMM may transition the main processor (or the virtual processor enabled by the main processor) from the EPT-mode to the SPT-mode prior to the beginning of the verification time interval and sampling of the execution state of the main processor. After the completion of the verification time interval, the PCM or the VMM may transition the main processor (or the virtual processor) back to the EPT-mode, for faster subsequent execution. Accordingly, the main processor may be noticeably slowed down only during a small part of its runtime, e.g., for 0.1 sec every 1 sec, in some implementations.

Figure 2A:
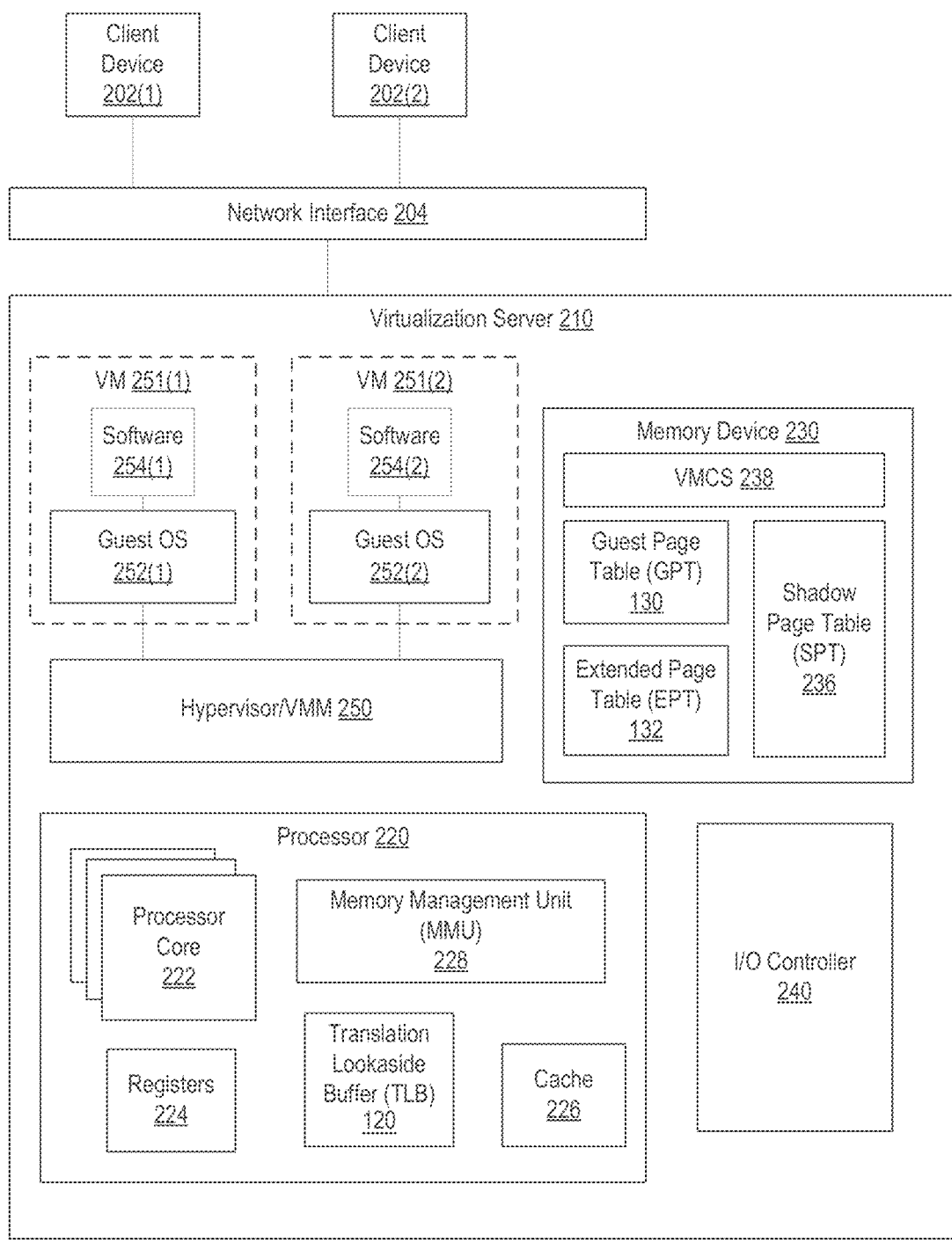
FIG. 2A depicts a high-level component diagram of an example processing system capable of implementing dynamic runtime transitions between extended page tables and shadow page tables, in accordance with one or more aspects of the present disclosure.

FIG. 2A depicts a high-level component diagram of an example processing system 200 capable of implementing dynamic runtime transitions between extended page tables and shadow page tables, in accordance with one or more aspects of the present disclosure. A virtualization server 210 may support multiple client devices 202 (two devices 202(1) and 202(2) are shown for illustration). The processing system 200 may further include a network interface 204 to connect the client devices 202 to the virtualization server 210. The network interface may be a local area network interface, a wireless local area network interface, an internet interface, and the like. The virtualization server 210 may include, but not be limited to, a processor 220, memory device 230, and an I/O controller 240. The virtualization server 210 may execute the hypervisor/VMM 250, to support one or more virtual machines (VMs) 251. The VM(s) 251 may have the GOS(s) 252 supporting one or more software programs 254 (e.g., software applications) accessible by a user of the client device 202. In various implementations, the processor 220 may include one or more processor cores 222, one or more registers 224 (e.g., hardware registers), TLB 120, cache 226, a memory-management unit (MMU) 228. Each processor core 222 of the processor 220 may support one or more hardware threads corresponding to logical processors. Some of the logical processors may support virtual processors assigned to various VMs 251. The memory device 230 may include dynamic random access memory (DRAM), synchronous DRAM (SDRAM), a static memory, such as static random access memory (SRAM), a flash memory, a data storage device, or other types of memory devices. For brevity, the memory device 230 will henceforth be referred to as memory 230.

Each GOS may support a client device 202 which may be a remote desktop computer, a tablet, a smartphone, another server, a thin/lean client, and the like. The VMM 250 may leverage hardware capabilities of the virtualization server 210. The GOS(s) 252 may be communicating with the VMM 250 to access the memory 230 and the processor 220. The memory 230 may contain the virtual machine control structure (VMCS) 238 to facilitate execution state of multiple VMs 251 on the processor 220. In some implementations, there may be multiple VMCS 238, for example one for each VM 251(1) and VM 251(2). With a change of the execution context of the processor 220 between different virtual machines, the VMCS for the current VM may save and later restore the execution state of the VM's virtual processor. The memory 230 may further store the GPT 130, the EPT 132, and the SPT 236. A separate GPT and a separate SPT may be stored for each VM 251. In some implementations, the GPT 130 may be managed by the corresponding GOS 152, whereas the EPT 132 and the SPT 236 may be managed by the VMM 250. The virtualization server 210 may implement dynamic switching between the EPT-mode and the SPT-mode of the memory access. For example, at a first instance of time, the VMM 250 may issue instructions to reconfigure the MMU 228 to execute memory requests from the VMs 251 by performing page walks in the SPT 236. At a second instance of time, the VMM 250 may issue instructions for the MMU to migrate back to the EPT-mode and to manage memory transactions via page walks in GPT and SPT.

Figure 2B:
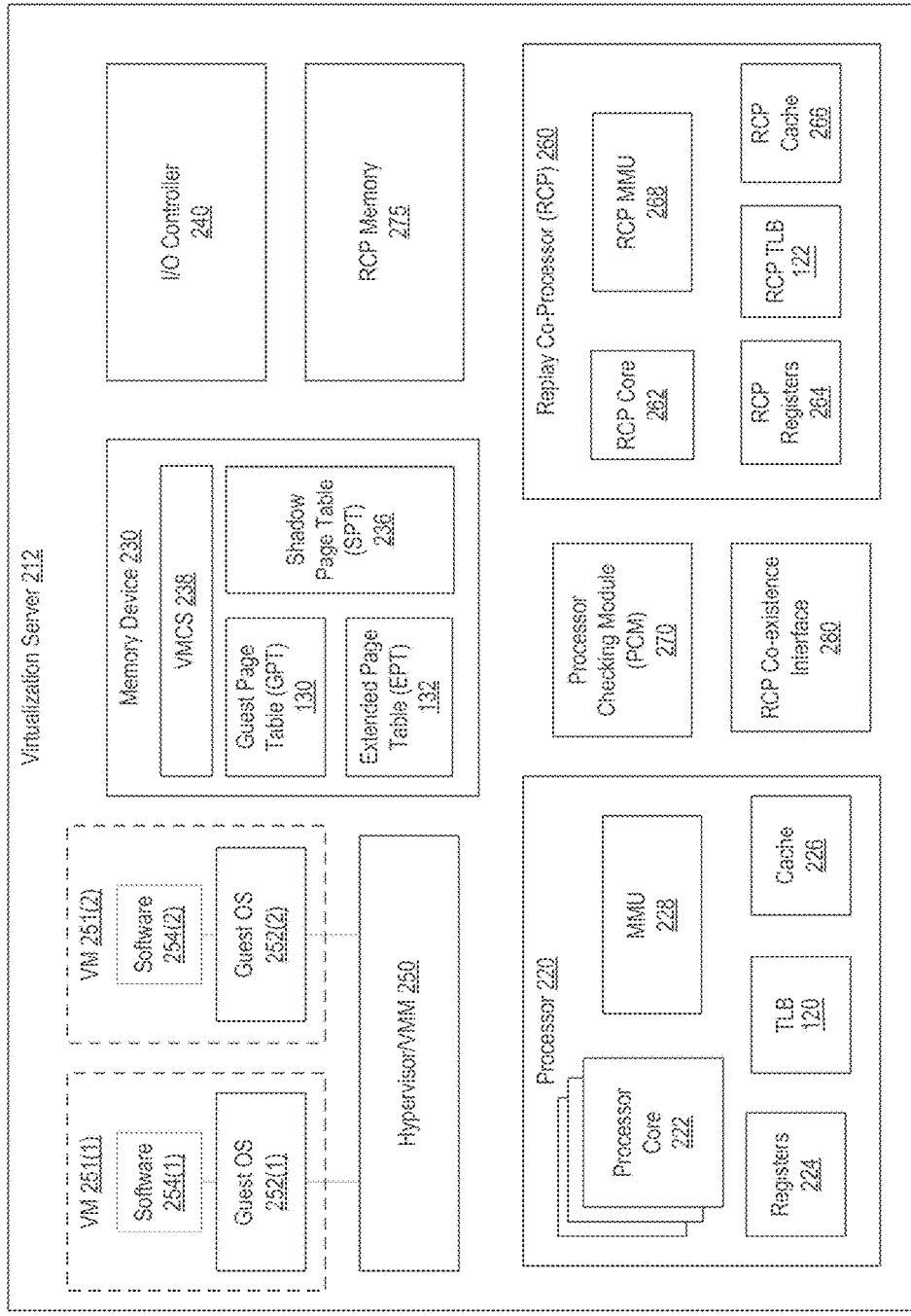
FIG. 2B depicts a high-level component diagram of an example processing system having a main processor and a replay co-processor capable of implementing dynamic runtime transitions between extended page tables and shadow page tables, in accordance with one or more aspects of the present disclosure.

FIG. 2B depicts a high-level component diagram of an example processing system 201 having a main processor 220 and a replay co-processor RCP 260 capable of implementing dynamic runtime transitions between extended page tables and shadow page tables, in accordance with one or more aspects of the present disclosure. The processing system 201 may include a virtualization server 212 supporting client devices (not explicitly shown). The virtualization server 212 may have some or all of the components of the virtualization server 210 illustrated in FIG. 2A. Additionally, the virtualization server 212 may include the RCP 260, the processor checking module 270, and the hardware RCP co-existence interface 280. The RCP 260 may include one or more processor cores (RCP core) 262, one or more RCP registers 264 (e.g., hardware registers), the RCP TLB 122, an RCP cache 266, and an RCP a memory-management unit (RCP MMU) 268. The RCP 260 may make use of a dedicated device (RCP memory) 275, in some implementations. In other implementations, the RCP 260 may use the memory 230 shared with the (main) processor 220. The hardware RCP coexistence interface 280 may facilitate periodic sampling of the processor, memory, and I/O state of the main processor and may include additional memory and I/O tracing hardware (not shown).

The PCM 270 may implement periodic verification of the processor 220 by the RCP 260. In some implementations, the PCM 270 may issue the verification instructions to transition the processor 220 from the EPT-mode to the SPT-mode, to copy the processor state (e.g., its execution context) of the processor 220 (or one of the virtual processors supported by the processor 220), to flush the TLB 120, to create the SPT 236, to transition from the SPT-mode back to the EPT-mode, to invalidate the SPT tables, to compare the processor state of the processor 220 at the end of the verification time interval with the resulting processor state of the RCP 260 after replaying, and/or issue any other instructions to facilitate periodic verification of the processor 220, depending on a particular implementation. In some implementation, the verification instructions issued by the PCM 270 may be executed by the processor 220 while in other implementations the verification instructions may be executed by the RCP 260. In other implementations, some of the verification instructions (e.g., creation of SPT 236) may be executed by the processor 220 whereas some other instructions (e.g., comparison of the execution states of the two processors) may be carried out by the RCP 260.

The PCM 270 may be implemented as a software module within the VMM 250 (such as the Linux KVM), in some implementations. In other implementations, the PCM 270 may be software-implemented outside the VMM 250. In some implementations, some of the functionality of the PCM may be hardware-implemented. The virtualization server 212 may further contain a hardware RCP co-existence interface 280 to facilitate sampling of the registers 224, state of the memory 230, and/or state of the I/O controller 240.

Figure 3:
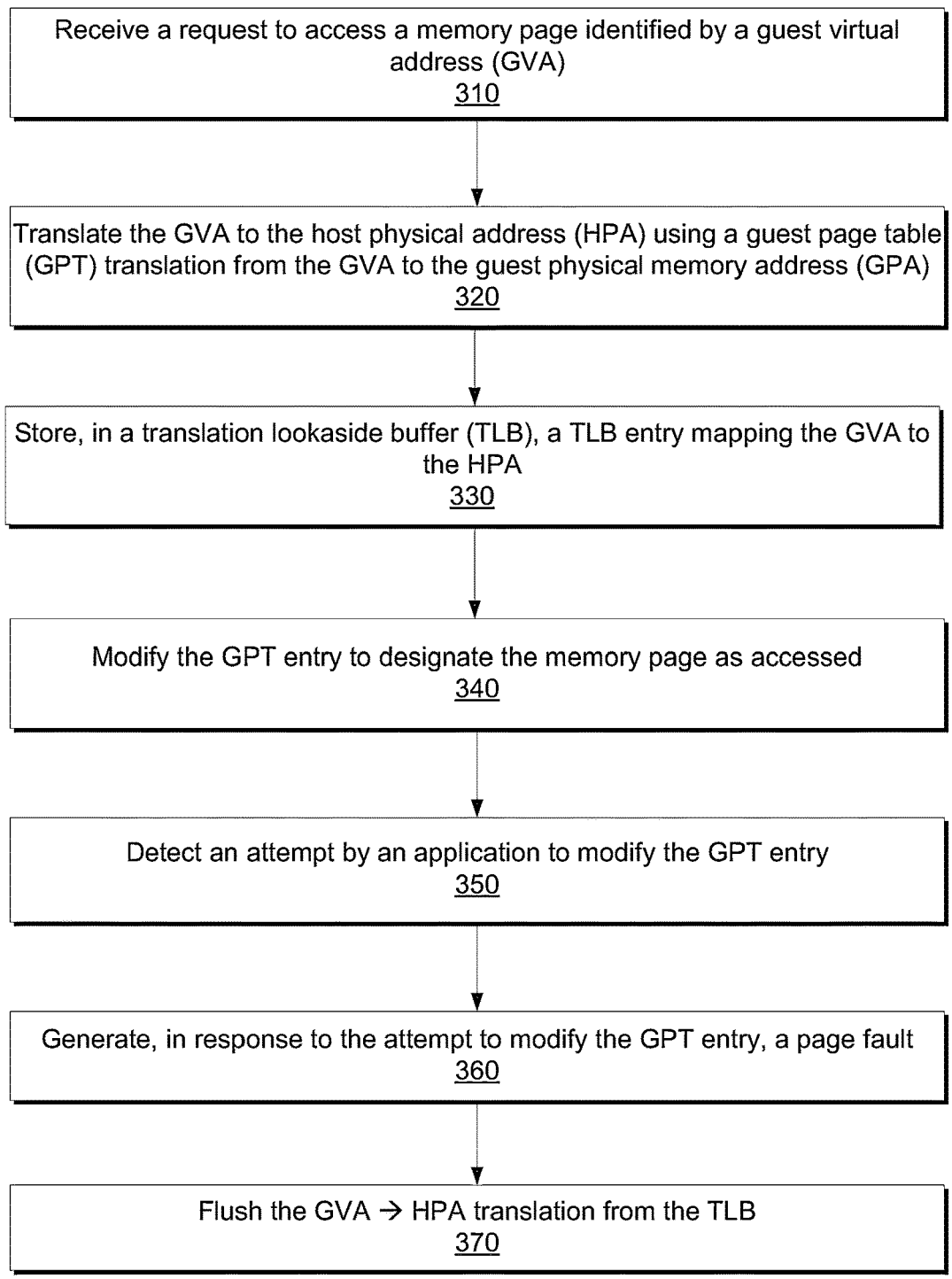
FIG. 3 depicts a flow diagram of an example method of flushing a TLB entry corresponding to a translation of a guest virtual memory address upon a modification of a guest page table entry corresponding to the guest virtual memory address.

FIGS. 3-6 depict flow diagrams of example methods 300-600 which may be used in different implementations for the periodic processor verification. Various implementations and modifications of methods 300-600 may be used for periodic verification of the integrity of the processor 220. Methods 300-600 may be performed by a computer system that may comprise hardware (e.g., circuitry, dedicated logic, and/or programmable logic), software (e.g., instructions executable on a computer system to perform hardware simulation), or a combination thereof. Methods 300-600 and/or each of its functions, routines, subroutines, or operations may be performed by one or more physical processors of the computer system executing the method. Two or more functions, routines, subroutines, or operations of each of methods 300-600 may be performed in parallel or in an order which may differ from the order described above. In certain implementations, methods 300-600 may be performed by a single processing thread. Alternatively, methods 300-600 may be performed by two or more processing threads, each thread executing one or more individual functions, routines, subroutines, or operations of the method. In an illustrative example, the processing threads implementing methods 300-600 may be synchronized (e.g., using semaphores, critical sections, and/or other thread synchronization mechanisms). Alternatively, the processing threads implementing methods 300-600 may be executed asynchronously with respect to each other. In one example, as illustrated by FIG. 3, methods 300-600 may be performed by the processing systems described herein below and illustrated by FIGS. 7-13.

FIG. 3 depicts a flow diagram of an example method 300 of flushing a TLB entry corresponding to a translation of a guest virtual memory address upon a modification of a guest page table entry corresponding to the guest virtual memory address. The method 300 may be performed by a processing system running a VM. The processing system (e.g., a system 200 or a system 201), may store, for example in memory 230, the GPT 130 comprising a GPT entry to map a GVA to a GPA. The processing system may be executing a VMM 250 which may start the GOS 252. The GPT 130 may be maintained by the GOS 252 to facilitate memory transactions for user software 254 running on the GOS 252. The GOS 252 may be the Windows operating system, Red Hat Linux operating system, the CentOS, or any other operating system. The GOS 252 or the software 254 may sometimes modify the GPT 130, e.g., by clearing the A-bit in a GPT entry to keep track of memory usage by software 254. In some implementations, the processing system may designate the GPT 130 as write-protected. In some implementations, the designation may be performed by the VMM 250 or by the PCM 270 for the purpose of the processor verification.

At block 310, the processing device, such as the processor 220, may receive a request to access a memory page identified by the GVA. In response to such request, at block 320, the processing device, may translate the GVA to the HPA using the GPT to obtain translation from the GVA to the GPA. In some implementations, this may be done by performing a page walk. In some implementations, the page walk may include a first walk in the GPT 130 to obtain the GVA→GPA translation and a second walk in the EPT 132 to obtain the GPA→HPA translation. Upon determining the HPA, the processor 220 (or the virtual processor supported by the processor 220) may load the corresponding memory page from the memory 230.

At block 330, the processing device may store the GPA→HPA translation entry in the TLB 120, in some implementations. At block 340, the processing device may designate the GPT entry corresponding to the GVA as accessed. In some implementations, to designate the A-bit as accessed, the processing device may set the A-bit (A=1) in the GPT entry. In various implementations, the blocks 320, 330, and 340 may be executed in various orders. At block 350, the method 300 may continue with the processing device detecting a modification of the GPT entry corresponding to the GVA. In some implementations, the modification of the GPT entry may be done by the GOS 252 (or the software 254 running on the GOS 252). In some implementations, the modification of the GPT entry may include clearing the A-bit (A=0).

At block 360, a page fault may be generated in response to the modification of the GPT entry. For example, when the GOS 252 changes the GPT 130 (e.g., by changing a GPT entry corresponding to the GVA), the VMM 250 may detect that a bit indicating that the GPT 130 is write-protected is set. At block 370, the processing device may flush, in response to the page fault, the translation entry GVA→HPA. In some implementations, detecting the modification of the GPT entry, generating a page fault, and flushing the translation entry may be facilitated by utilizing the SPT 236, as explained above. The SPT 236 may be created (or populated) by the VMM 250 (and/or the PCM 270), to contain a plurality of direct GVA→HPA translations. In some implementations, the SPT 236 may be populated from the data contained in the GPT 130 and the EPT 132.

In some implementations, when the page fault is generated, a VM-exit may occur and the VMM 250 may take over the processor 220 (or the virtual processor). The VMM 250 may then remap the SPT 236 (and the GPT 130) with the changes made (or attempted to be made) by the GOS 252 to the GPT 130 at block 370, so that GVAs in the GPT are consistent with GVAs in the SPT. For example, the VMM 250 may clear the accessed bit in both the GPT entry and in the corresponding SPT entry. The MMU 228 may also flush the memory translation from the TLB 120. In some implementations, only the transaction(s) corresponding to the modified GPT entry(ies) may be flushed. In other implementations, the entire content of the TLB 120 may be flushed.

As a result, after flushing the TLB 120 in accordance with one of the described embodiments, the A=0 state of the GPT entry may be correlated with the absence of the corresponding translation in the TLB 120. Accordingly, the TLB 120 may not have translation entries that would prevent the processor 220 from walking the page tables and that might result in inconsistencies with the execution state of the RCP 260 during a replay processing.

Figure 4:
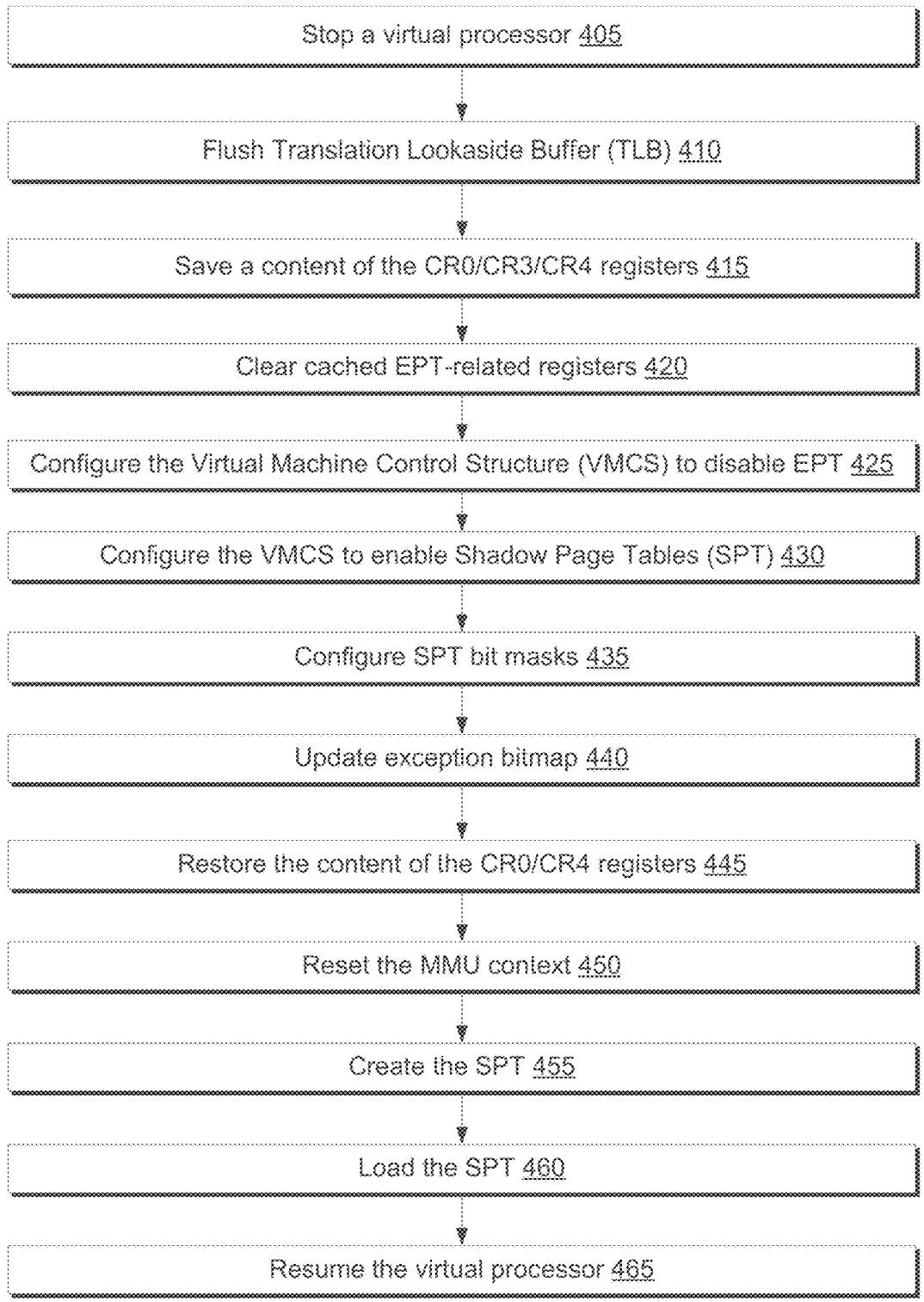
FIG. 4 depicts a flow diagram of an example method of transitioning from the extended page table-enabled memory access mode to the shadow page table-enabled memory access mode, in accordance with one or more aspects of the present disclosure.

FIG. 4 depicts a flow diagram of an example method 400 of transitioning from the extended page table-enabled memory access mode to the shadow page table-enabled memory access mode, in accordance with one or more aspects of the present disclosure. When the VMM 250 (and/or PCM 270) selects an instance of time to transition the processor 220 (or the virtual processor supported by the processor 220) from the EPT-mode to the SPT-mode, at block 405, the VMM 250 may temporarily stop processes being executed by the virtual processor assigned to the VM (e.g., the VM 251(1)). At block 410, the TLB 120 may be flushed (e.g., by the MMU 228). In some implementations, only the content of the TLB 120 that is associated with the virtual processor may be flushed. In some implementations, TLB flushing may not be performed during the transitioning from the EPT-mode to the SPT-mode. Instead, TLB flushing may be performed during processor execution in the SPT-mode, in response to the modification of the GPT, as explained above. At block 415, a content of some of the registers 224 of the processor 220 may be stored. In some implementations, the registers whose content is to be stored may include some or all of the CR0/CR3/CR4 registers. In some implementations, the registers whose content is to be stored may be the registers for the virtual processor. The content of the registers may be stored on the memory 230 or on the RCP memory 275.

The method 400 may continue at block 420 where the VMM 250 (and/or the PCM 270) may clear cached EPT-related hardware registers of the virtual processor. At block 425, the VMM 250 may configure the VMCS 238 for the virtual processor to disable the EPT 132. For example, the VMM 250 may cause the VMCS 238 to clear the references to the memory addresses in the CR3 register for the virtual processor that store the location of the EPT 132 on the memory 230. At block 430, the VMM 250 (and/or the PCM 270) may configure the VMCS 238 for the virtual processor to enable the SPT 236. For example, the VMCS 238 may store in the CR3 register for the virtual processor the location of the SPT 236 on the memory 230. At block 435, the method 400 may configure the SPT bitmasks. At block 440, an exception bitmap may be updated. The exception bitmap may contain bits whose state (e.g., 1 or 0) is to indicate how exceptions (such as faults, traps, and aborts) should be treated. In particular, the exception bitmaps may indicate whether a particular page fault is to cause a VM-exit or not.

The method 400 may, at block 445, restore the content of the CR0/CR4 registers of the processor 220 (or of the corresponding virtual registers of the virtual processor). In some implementations, the content of the registers is loaded from the memory 230 (or the RCP memory 275) stored previously at block 415. At block 450, the VMM 250 (and/or the PCM 270) may reset the context of the MMU 228. At block 455, the VMM 250 may create the SPT 236. In some implementations, the SPT 236 may be populated with the entire content of the GPT 130 and the corresponding to them entries of the EPT 132. In other implementations, only a part of the GPT 130 and the corresponding to them entries of the EPT 132 may be stored in the SPT 236. In some implementations, the SPT 236 may by created by the method 500 disclosed below. The created SPT 236 may be loaded at block 460. For example, the location of the SPT 236 on the memory 230 (or the RCP memory 275) may be written into the CR3 register (or the virtual CR3 register). The method 400 may conclude with resuming execution of the stopped processes on the virtual processor at block 465 in the SPT-mode. Various blocks in the method 400 may be performed in an order different from the order indicated in FIG. 4. Various blocks of the method 400 may be performed concurrently with each other.

Figure 5:
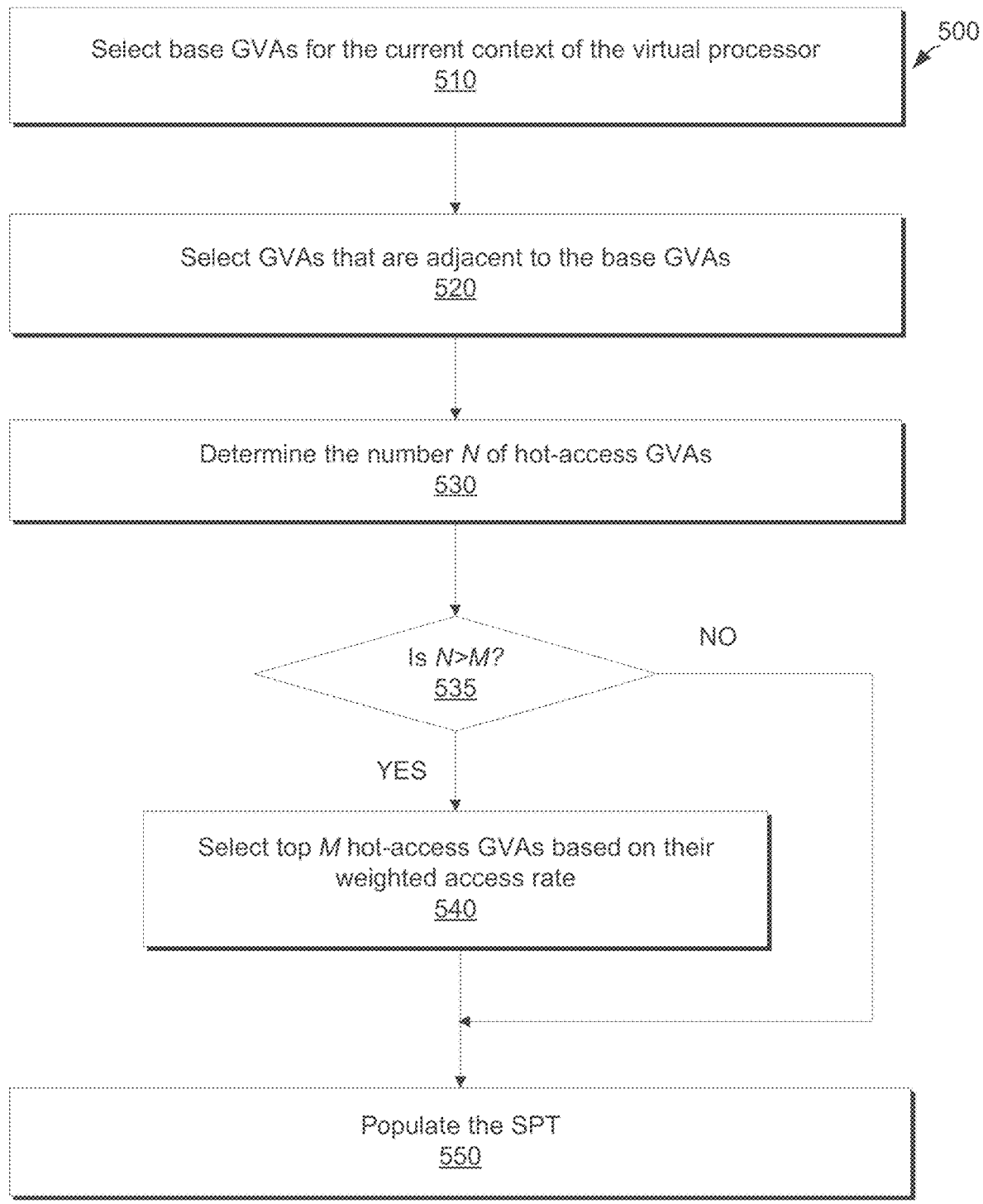
FIG. 5 depicts a flow diagram of an example method of pre-populating the shadow page tables to optimize transition from the extended page-table enabled memory access mode to the shadow page table-enabled memory access mode, in accordance with one or more aspects of the present disclosure.

FIG. 5 depicts a flow diagram of an example method 500 of pre-populating the shadow page tables to optimize transition from the extended page-table enabled memory access mode to the shadow page table-enabled memory access mode, in accordance with one or more aspects of the present disclosure. In some implementations, method 500 may be performed as part of the block 455. Method 500 may seek a balance between creating the SPT 236 that is too voluminous (which may be inefficient and take a lot of time) and under-populating the SPT (which may result in too many page faults during the subsequent virtual processor execution and, likewise, be inefficient). By prepopulating the SPT 236 with the GVAs that are most likely to be used in the subsequent execution, method 500 may decrease the amount of time lost during VM-exits triggered by page faults while also keeping to a minimum the amount of time used creating the SPT 236.

At block 510, the VMM 250 (and/or the PCM 270) may select base GVAs for the current context of the virtual processor. For example, the VMM 250, via the MMU 228 may retrieve from the instruction pointer (e.g., RIP/RSP/RDI/RSI/RBP/GS_BASE/GDTR_BASE/IDTR_BASE/LDTR_BASE/TR_BASE of the virtual processor) the GVAs that are likely to be accessed soon. The selected base GVAs and their translations GVA→HPA may be stored as "seeds" for the SPT 236. At block 520, the method 500 may select GVAs that are adjacent to the base GVA selected at block 510. "Adjacent" may mean a GVA address that is contiguous to a base GVA, or a GVA that is the closest valid GVA to the base GVA. It is likely that such adjacent GVAs will be accessed soon. This is because the virtual processor execution is likely to reach to the subsequent GVAs if the execution is sequential or to make short jumps, if the execution branches. It may also be likely that the previous addresses belong to the same execution context. In some implementations, an equal number of subsequent and previous GVAs is pre-fetched. In other implementation, these numbers can be significantly different, e.g., the number of subsequent GVAs to be pre-fetched may be greater than the number of preceding GVAs to be pre-fetched. In some implementations, a certain amount of memory pages corresponding to the adjacent GVAs, e.g., 16 MB, may be selected and their translations stored in the SPT 236. The same procedure may be applied to each base GVA if there are multiple base GVAs in the instruction pointer.

At block 530, method 500 may continue with determining those GVAs that are frequently accessed by the GOS 252 and/or software 254 running on it. Some of the software 254 may share the same GPT 130 and some of the GPT entries may, therefore, be accessed more frequently than other entries. For example, the kernel mode code of the GOS 252 may be accessed more often. Pre-populating the SPT 236 with such "hot-access" GVAs may significantly reduce the number of page faults during the subsequent processor execution in the SPT-mode. To select most frequently accessed GVAs, the VMM 250 (and/or the PCM 270) may start with analyzing historical data of GVA accesses. In some implementations, collection of such data may occur continuously. In other implementations, collection of such data may begin at a certain time prior to the anticipated transition from the EPT-mode to the SPT-mode. In some implementations, the historical data may be collected for a certain sampling window that includes a certain number of prior execution epochs, e.g., a 100 last execution epochs, or any other number. During this sampling window, a number of instances when a GVA caused a page fault may be determined. Subsequently, the GVAs with the highest number of page faults may be determined. In some implementations, a fixed number N of the most frequently accessed GVAs may be selected. In some implementations, all GVAs that caused a certain number of page faults may be determined so that the number N may be different between two consecutive EPT-to-SPT mode transitions.

At decision block 535, the number N may be compared with a predetermined number M of those hot-access GVAs that are ultimately to be selected for pre-population of the SPT 236. If the number N exceeds M, at block 540 the method 500 may continue with additionally weighting the N GVAs to determine the hotness H of each GVA and selecting the M GVAs with the highest hotness values H. For example, it may be determined that a page identified by a GVA r triggered $P_i^r$ page faults during the i-th sample (e.g., execution epoch). A weight $W_i$ may be assigned to the i-th sample. For example, the maximum weight may be assigned to the sample that is closest in time whereas smaller weight may be assigned to the samples that are further in the past. In one possible implementation, the hotness $H^r$ of the GVA r may be determined by weighting the number of page faults over the entire sampling window according to $$H^r = \sum_i W_i P_i^r$$

where the summation is taken over the samples (e.g., execution epochs) within the sampling window. The top M hot-access GVAs, namely M GVAs with the highest hotness $H^r$ may then be selected for addition to the SPT 236. In those implementations where the number N does not exceed M, the method 500 may skip the block 540 and select all N GVA for addition to the SPT 236.

At block 550, the VMM 250 (and/or the PCM 270) may populate the SPT 236 with the translations corresponding to GVAs that may include but not be limited to the base GVAs selected during block 510, the GVAs adjacent to the base GVAs selected during block 520, and the hot-access GVAs selected during blocks 530-540. The heuristic pre-fetching according to method 500 may ensure that the number of page faults during the RCP verification stage that takes advantage of the SPT 236 is minimized and that the execution of the processor 220 (or the virtual processor) is not slowed down too significantly.

The following table illustrates the effectiveness of pre-fetching according to some implementations of methods 400-500. Shown are approximate numbers of instructions captured during the 0.1 sec subsequent execution in the SPT-mode by the SPT 236 with and without pre-fetching. The captured instructions are counted as branches, where a brunch is a sequence of instructions without a jump in the GVA space.

| Workload running in GOS | Without pre-fetching | With pre-fetching |
|---|---|---|
| Idle | ~10 branches | ~100 branches |
| Linux kernel code compiling | ~20 branches | ~700 branches |

The data shown indicate that the number of instructions captured is increased significantly when the pre-fetching heuristics of the methods 400-500 are utilized compared to when they are not; this represents a proof of concept for the disclosed improvements.

Figure 6:
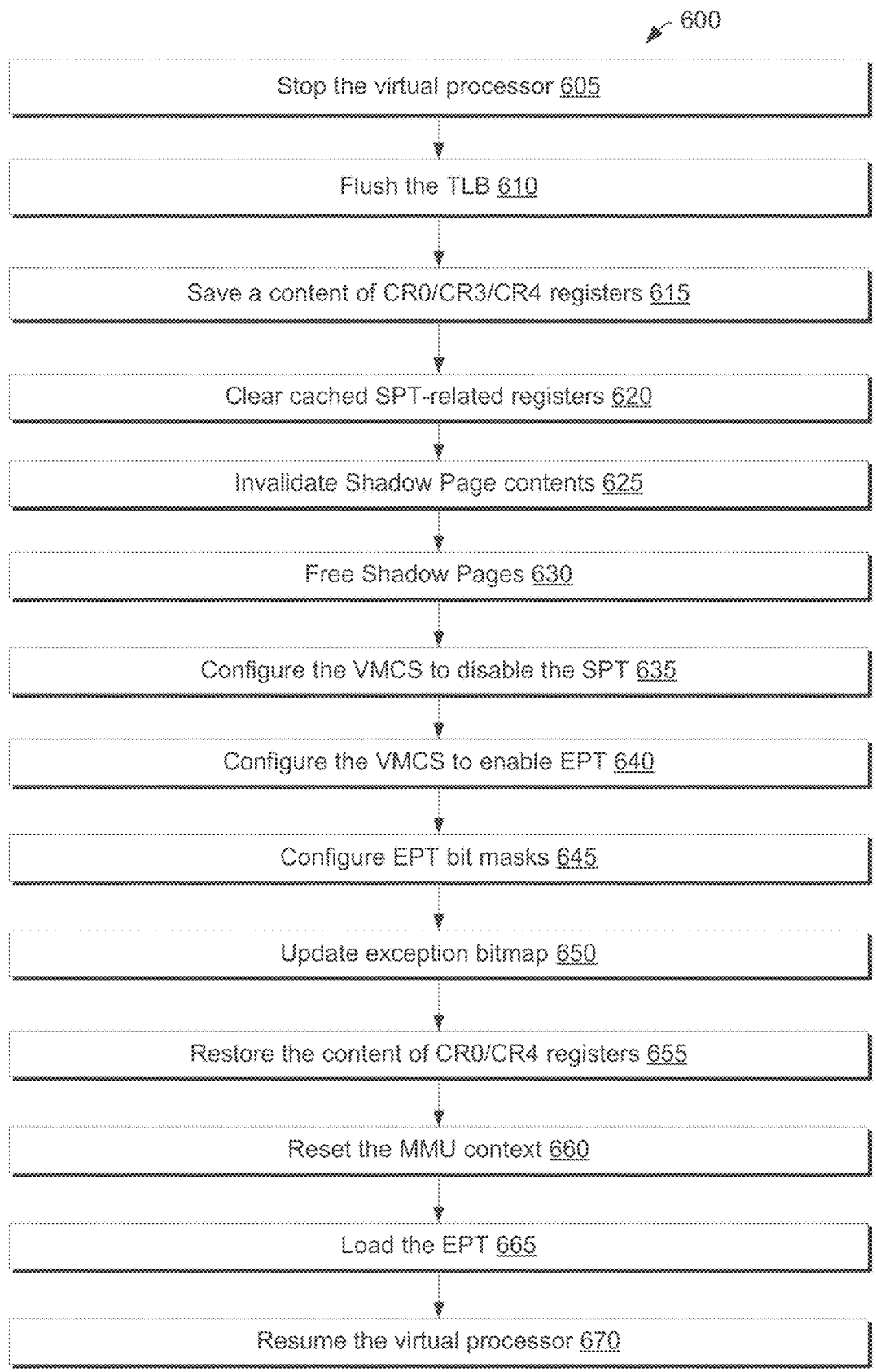
FIG. 6 depicts a flow diagram of an example method of transitioning from the shadow page table-enabled memory access mode to the extended page table-enabled memory access mode, in accordance with one or more aspects of the present disclosure.

FIG. 6 depicts a flow diagram of an example method 600 of transitioning from the shadow page table-enabled memory access mode to the extended page table-enabled memory access mode, in accordance with one or more aspects of the present disclosure. When the VMM 250 (and/or PCM 270) selects an instance of time to transition the processor 220 (or the virtual processor supported by the processor 220) from the SPT-mode to the EPT-mode, at block 605, the VMM 250 may temporarily stop processes being executed by the virtual processor assigned to the VM (e.g., the VM 251(1)). At block 610, the TLB 120 may be flushed (e.g., by the MMU 228). In some implementations, only the content of the TLB 120 that is associated with the virtual processor may be flushed. At block 615, a content of some of the registers 224 of the processor 220 may be stored. In some implementations, the registers whose content is to be stored may include some or all of the CR0/CR3/CR4 registers. In some implementations, the registers whose content is to be stored may be the registers for the virtual processor. The content of the registers may be stored on the memory 230 or on the RCP memory 275.

The method 600 may continue at block 620 where the VMM 250 (and/or the PCM 270) may clear cached SPT-related hardware registers of the virtual processor. At block 625, the VMM 250 may invalidate the SPT contents. In some implementations, this may be done by clearing the locations of the SPT 236 from the CR3 register of the processor 220. At block 630, the memory pages allocated for SPT mode may be freed. At block 635, the method 600 may continue with configuring the VMCS 238 for the virtual processor to disable the SPT 236. For example, the VMM 250 may cause the VMCS 238 to clear the references to the memory addresses in the CR3 register for the virtual processor that store the location of the SPT 236 on the memory 230. At block 640, the VMM 250 (and/or the PCM 270) may configure the VMCS 238 for the virtual processor to enable the EPT 132. For example, the VMCS 238 may store in the CR3 register for the virtual processor the location of the EPT 132 on the memory 230. At block 645, the method 400 may configure the SPT bitmasks. At block 650, an exception bitmap may be updated. The exception bitmap may contain bits whose state (e.g., 1 or 0) is to indicate how exceptions (such as faults, traps, and aborts) should be treated. In particular, the exception bitmaps may indicate whether a particular page fault is to cause a VM-exit or not.

The method 600 may, at block 655, restore the content of the CR0/CR4 registers of the processor 220 (or of the corresponding virtual registers of the virtual processor). In some implementations, the content of the registers is loaded from the memory 230 (or the RCP memory 275) stored previously at block 615. At block 660, the VMM 250 (and/or the PCM 270) may reset the context of the MMU 228. At block 665, the VMM 250 may load the EPT 132. In some implementations, the loaded EPT may be the most recent EPT used during the previous execution in the EPT-mode. The location of the EPT 132 on the memory 230 (or the RCP memory 275) may be written into the CR3 register (or the virtual CR3 register). The method 600 may conclude with resuming execution of the stopped processes on the virtual processor at block 670 in the EPT-mode. Various blocks in the method 600 may be performed in an order different from the order indicated in FIG. 4. Various blocks of the method 600 may be performed concurrently with each other.

Figure 7A:
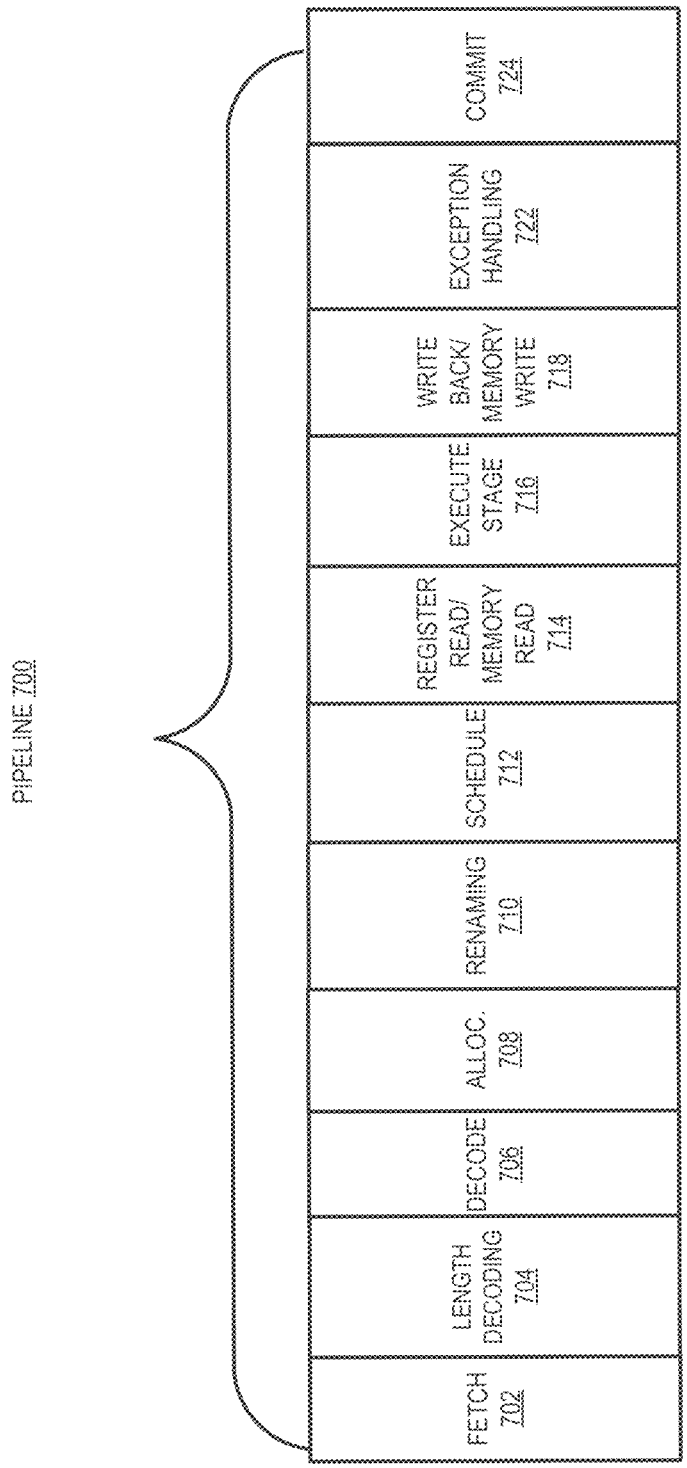
FIG. 7A is a block diagram illustrating a micro-architecture for a processor in which one implementation of the disclosure may be used.
Figure 7B:
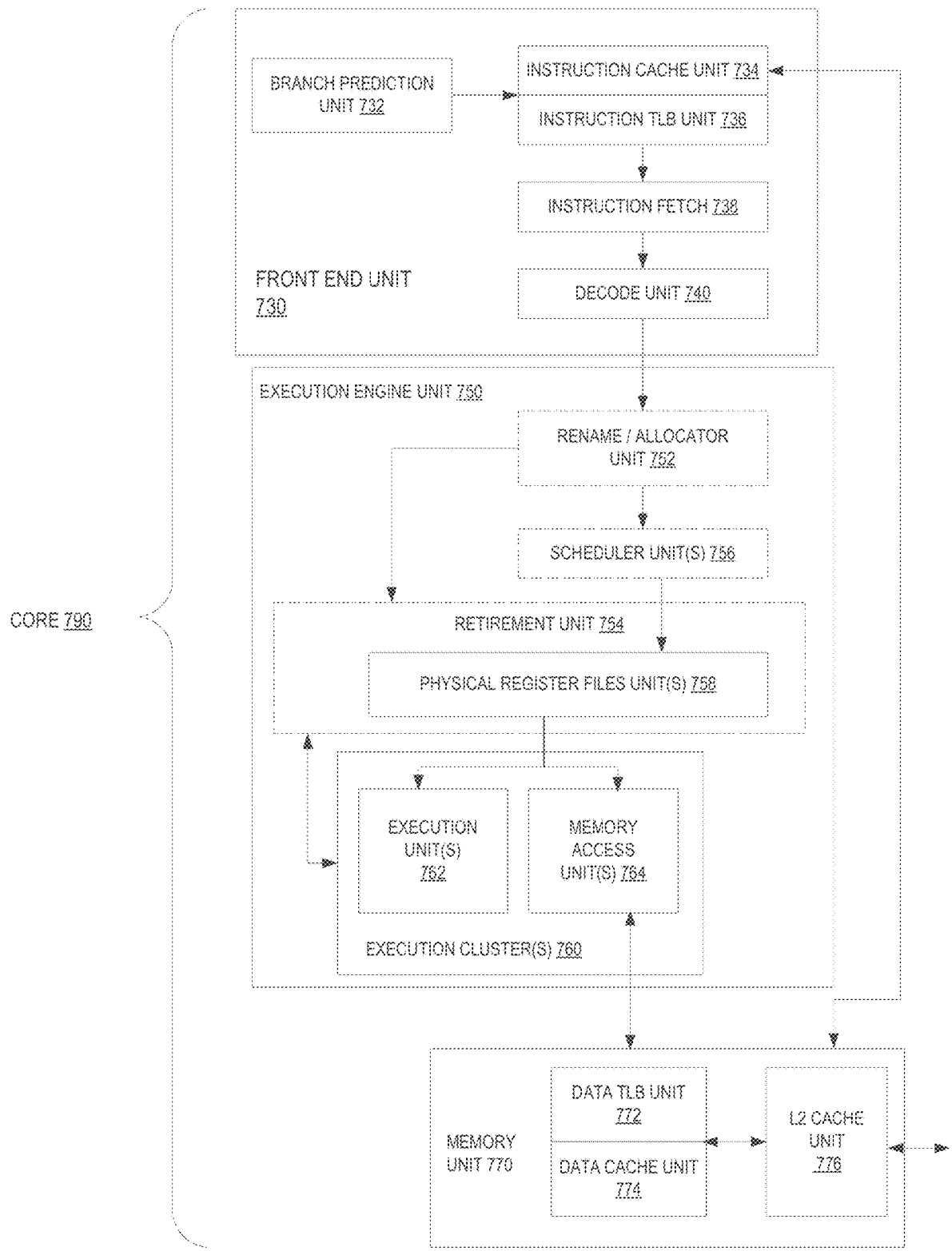
FIG. 7B is a block diagram illustrating an in-order pipeline and a register renaming stage, out-of-order issue/execution pipeline implemented according to at least one implementation of the disclosure.

FIG. 7A is a block diagram illustrating an in-order pipeline and a register re-naming stage, out-of-order issue/execution pipeline of a processor monitoring performance of a processing device to provide dynamical switching between extended page tables and shadow page tables for runtime processor verification according to at least one implementation of the disclosure. FIG. 7B is a block diagram illustrating an in-order architecture core and a register renaming logic, out-of-order issue/execution logic to be included in a processor according to at least one implementation of the disclosure. The solid lined boxes in FIG. 7A illustrate the in-order pipeline, while the dashed lined boxes illustrates the register renaming, out-of-order issue/execution pipeline. Similarly, the solid lined boxes in FIG. 7B illustrate the in-order architecture logic, while the dashed lined boxes illustrates the register renaming logic and out-of-order issue/execution logic.

In FIG. 7A, a processor pipeline 700 includes a fetch stage 702, a length decoding stage 704, a decode stage 706, an allocation stage 708, a renaming stage 710, a schedule (also known as a dispatch or issue) stage 712, a register read/memory read stage 714, an execute stage 716, a write back/memory write stage 718, an exception handling stage 722, and a commit stage 724. In some implementations, the stages are provided in a different order and different stages may be considered in-order and out-of-order.

In FIG. 7B, arrows denote a coupling between two or more units and the direction of the arrow indicates a direction of data flow between those units. FIG. 7B shows processor core (core) 790 including a front end unit 730 coupled to an execution engine unit 750, and both are coupled to a memory unit 770.

The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit or decoder may decode instructions, and generate as an output one or more micro-operations, micro-code entry points, microinstructions, other instructions, or other control signals, which are decoded from, or which otherwise reflect, or are derived from, the original instructions. The decoder may be implemented using various different mechanisms. Examples of suitable mechanisms include, but are not limited to, look-up tables, hardware implementations, programmable logic arrays (PLAs), microcode read only memories (ROMs), etc. The instruction cache unit 734 is further coupled to a level 2 (L2) cache unit 776 in the memory unit 770. The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 758 is overlapped by the retirement unit 754 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point).

While some implementations may include a number of execution units dedicated to specific functions or sets of functions, other implementations may include one execution unit or multiple execution units that all perform all functions. The scheduler unit(s) 756, physical register file(s) unit(s) 758, and execution cluster(s) 760 are shown as being possibly plural because certain implementations create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain implementations are implemented in which the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary implementation, the memory access units 764 may include a load unit, a store address unit, and a store data unit, each of which is coupled to the data TLB unit 772 in the memory unit 770. The L2 cache unit 776 is coupled to one or more other levels of cache and eventually to a main memory.

By way of example, the exemplary register renaming, out-of-order issue/execution core architecture may implement the pipeline 700 of FIG. 7A as follows: 1) the instruction fetch 38 performs the fetch and length decoding stages 702 and 704 respectively; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7)

various units may be involved in the exception handling stage 722) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, CA; the ARM instruction set (with additional extensions such as NEON) of ARM Holdings of Sunnyvale, CA).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in-order architecture. While the illustrated implementation of the processor also includes a separate instruction and data cache units 734/774 and a shared L2 cache unit 776, alternative implementations may have a single internal cache for both instructions and data, such as, for example, a Level 1 (L1) internal cache, or multiple levels of internal cache. In some implementations, the system may include a combination of an internal cache and an external cache that is external to the core and/or the processor. Alternatively, all of the cache may be external to the core and/or the processor.

Figure 8:
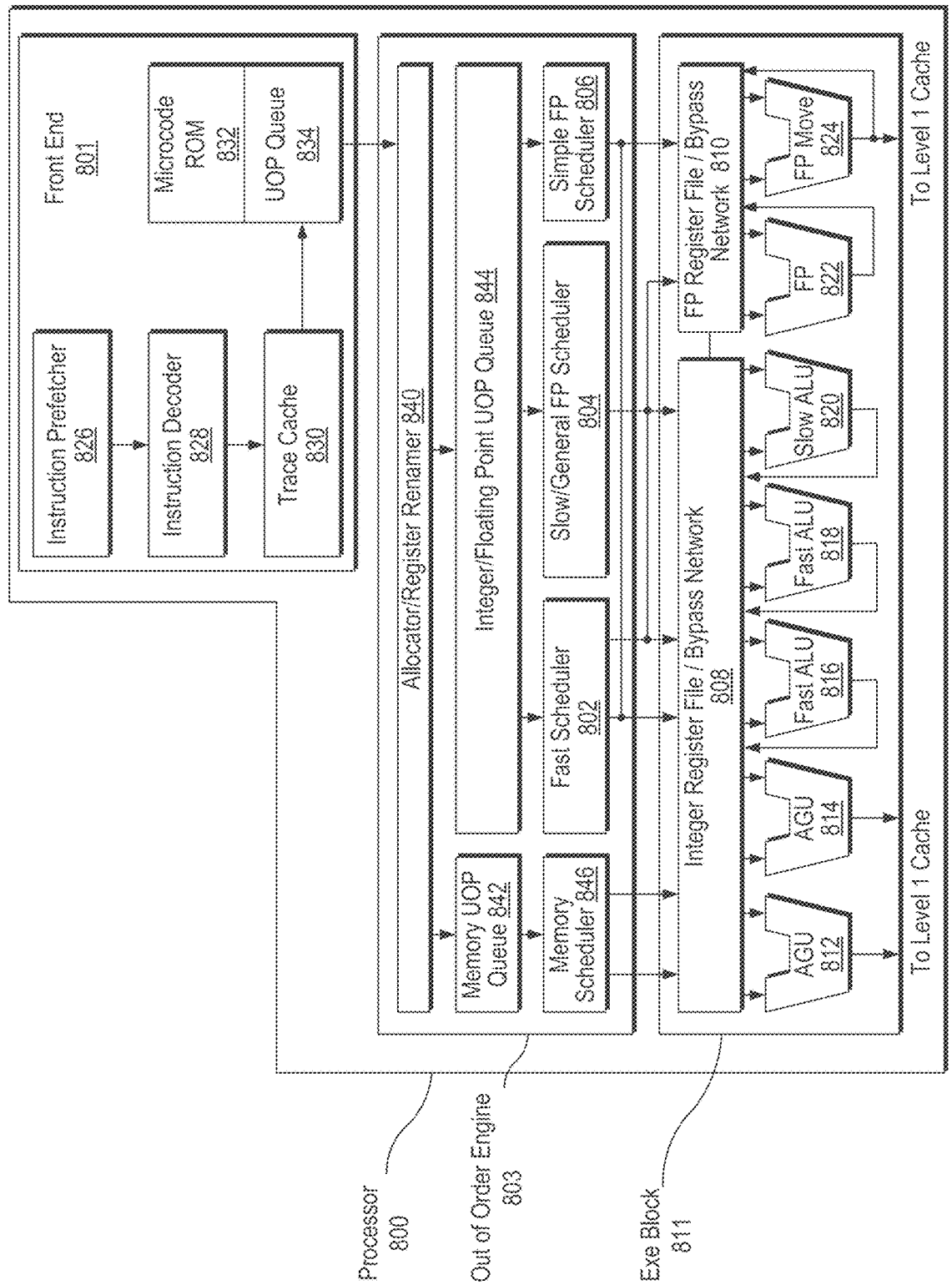
FIG. 8 illustrates a block diagram of the micro-architecture for a processing device that includes logic circuits to provide dynamical switching between extended page tables and shadow page tables for runtime processor verification.

FIG. 8 illustrates a block diagram of the micro-architecture for a processing device 800 that includes logic circuits to provide dynamical switching between extended page tables and shadow page tables for runtime processor verification. In some implementations, an instruction may be implemented to operate on data elements having sizes of byte, word, doubleword, quadword, etc., as well as datatypes, such as single and double precision integer and floating point datatypes. In one implementation the in-order front end 801 is the part of the processing device 800 that fetches instructions to be executed and prepares them to be used later in the processing device pipeline. The implementations to enable dynamical switching between extended page tables and shadow page tables for runtime processor verification may be implemented in processing device 800.

The front end 801 may include several units. In one implementation, the instruction prefetcher 826 fetches instructions from memory and feeds them to an instruction decoder 828 which in turn decodes or interprets them. For example, in one implementation, the decoder decodes a received instruction into one or more operations called "micro-instructions" or "micro-operations" (also called micro op or uops) that the machine can execute. In other implementations, the decoder parses the instruction into an opcode and corresponding data and control fields that are used by the micro-architecture to perform operations in accordance with one implementation. In one implementation, the trace cache 830 takes decoded uops and assembles them into program ordered sequences or traces in the uop queue 834 for execution. When the trace cache 830 encounters a complex instruction, the microcode ROM 832 provides the uops needed to complete the operation.

Some instructions are converted into a single micro-op, whereas others need several micro-ops to complete the full operation. In one implementation, if more than four micro-ops are needed to complete an instruction, the decoder 818 accesses the microcode ROM 832 to do the instruction. For one implementation, an instruction may be decoded into a small number of micro ops for processing at the instruction decoder 828. In another implementation, an instruction may be stored within the microcode ROM 832 should a number of micro-ops be needed to accomplish the operation. The trace cache 830 refers to an entry point programmable logic array (PLA) to determine a correct micro-instruction pointer for reading the micro-code sequences to complete one or more instructions in accordance with one implementation from the micro-code ROM 832. After the microcode ROM 832 finishes sequencing micro-ops for an instruction, the front end 801 of the machine resumes fetching micro-ops from the trace cache 830.

The out-of-order execution engine 803 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The allocator/register renaming logic 840 renames logic registers onto entries in a register file. The allocator 840 also allocates an entry for each uop in one of the two uop queues, one for memory operations 842 and one for non-memory operations 844, in front of the instruction schedulers: memory scheduler 846, fast scheduler 802, slow/general floating point scheduler 804, and simple floating point scheduler 806. The uop schedulers 802, 804, 806, determine when a uop is ready to execute based on the readiness of their dependent input register operand sources and the availability of the execution resources the uops need to complete their operation. The fast scheduler 802 of one implementation may schedule on each half of the main clock cycle while the other schedulers may only schedule once per main processing device clock cycle. The schedulers arbitrate for the dispatch ports to schedule uops for execution.

Register files 808, 810, sit between the schedulers 802, 804, 806, and the execution units 812, 814, 816, 818, 820, 822, 824 in the execution block 811. There is a separate register file 808, 810, for integer and floating point operations, respectively. Each register file 808, 810, of one implementation also includes a bypass network that may bypass or forward just completed results that have not yet been written into the register file to new dependent uops. The integer register file 808 and the floating point register file 810 are also capable of communicating data with the other. For one implementation, the integer register file 808 is split into two separate register files, one register file for the low order 32 bits of data and a second register file for the high order 32 bits of data. The floating point register file 810 of one implementation has 128 bit wide entries because floating point instructions typically have operands from 64 to 128 bits in width.

The execution block 811 contains the execution units 812, 814, 816, 818, 820, 822, 824, where the instructions are actually executed. This section includes the register files 808, 810, that store the integer and floating point data operand values that the micro-instructions need to execute. The processing device 800 of one implementation is comprised of a number of execution units: address generation unit (AGU) 812, AGU 814, fast ALU 816, fast ALU 818, slow ALU 820, floating point ALU 822, floating point move unit 824. For one implementation, the floating point execution blocks 812, 814, execute floating point, MMX, SIMD, and SSE, or other operations. The floating point ALU 812 of one implementation includes a 64 bit by 64 bit floating point divider to execute divide, square root, and remainder micro-op s. For implementations of the disclosure, instructions involving a floating point value may be handled with the floating point hardware.

In one implementation, the ALU operations go to the high-speed ALU execution units 816, 818. The fast ALUs 816, 818, of one implementation may execute fast operations with an effective latency of half a clock cycle. For one implementation, most complex integer operations go to the slow ALU 820 as the slow ALU 820 includes integer execution hardware for long latency type of operations, such as a multiplier, shifts, flag logic, and branch processing. Memory load/store operations are executed by the AGUs 812, 814. For one implementation, the integer ALUs 816, 818, 820, are described in the context of performing integer operations on 64 bit data operands. In alternative implementations, the ALUs 816, 818, 820, may be implemented to support a variety of data bits including 16, 32, 128, 256, etc. Similarly, the floating point units 822, 824, may be implemented to support a range of operands having bits of various widths. For one implementation, the floating point units 822, 824, may operate on 128 bits wide packed data operands in conjunction with SIMD and multimedia instructions.

In one implementation, the uops schedulers 802, 804, 806, dispatch dependent operations before the parent load has finished executing. As uops are speculatively scheduled and executed in processing device 800, the processing device 800 also includes logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one implementation of a processing device are also designed to catch instruction sequences for text string comparison operations. The processing device 800 also includes logic to enable dynamical switching between extended page tables and shadow page tables for runtime processor verification, according to one implementation.

The term "registers" may refer to the on-board processing device storage locations that are used as part of instructions to identify operands. In other words, registers may be those that are usable from the outside of the processing device (from a programmer's perspective). However, the registers of an implementation should not be limited in meaning to a particular type of circuit. Rather, a register of an implementation is capable of storing and providing data, and performing the functions described herein. The registers described herein may be implemented by circuitry within a processing device using any number of different techniques, such as dedicated physical registers, dynamically allocated physical registers using register renaming, combinations of dedicated and dynamically allocated physical registers, etc. In one implementation, integer registers store thirty-two bit integer data. A register file of one implementation also contains eight multimedia SIMD registers for packed data.

For the discussions herein, the registers are understood to be data registers designed to hold packed data, such as 64 bits wide MMX™ registers (also referred to as 'mm' registers in some instances) in microprocessing devices enabled with MMX technology from Intel Corporation of Santa Clara, California. These MMX registers, available in both integer and floating point forms, may operate with packed data elements that accompany SIMD and SSE instructions. Similarly, 128 bits wide XMM registers relating to SSE2, SSE3, SSE4, or beyond (referred to generically as "SSEx") technology may also be used to hold such packed data operands. In one implementation, in storing packed data and integer data, the registers do not need to differentiate between the two data types. In one implementation, integer and floating point are either contained in the same register file or different register files. Furthermore, in one implementation, floating point and integer data may be stored in different registers or the same registers.

Figure 9:
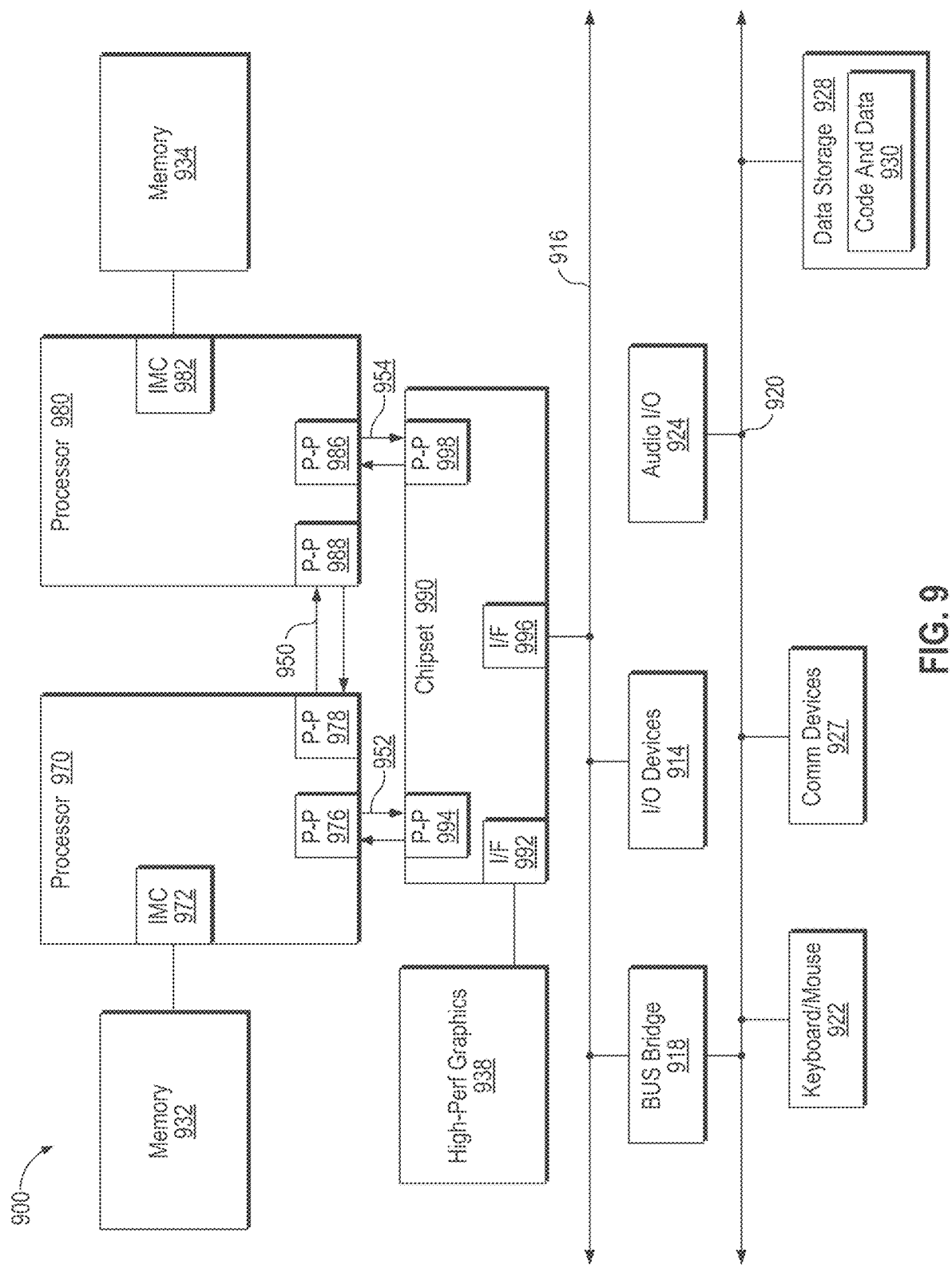
FIG. 9 is a block diagram of a computer system according to one implementation.

Implementations to enable dynamical switching between extended page tables and shadow page tables for runtime processor verification may be implemented in many different system types. Referring now to FIG. 9, shown is a block diagram of a multiprocessing device system 900 in accordance with an implementation. As shown in FIG. 9, multi-processing device system 900 is a point-to-point interconnect system, and includes a first processing device 970 and a second processing device 980 coupled via a point-to-point interconnect 950. As shown in FIG. 9, each of processing devices 970 and 980 may be multicore processing devices, including first and second processing device cores (not shown), although potentially many more cores may be present in the processing devices. The processing devices each may include hybrid write mode logics in accordance with an implementation of the present. The implementations to enable dynamical switching between extended page tables and shadow page tables for runtime processor verification may be implemented in the processing device 970, processing device 980, or both.

While shown with two processing devices 970, 980, it is to be understood that the scope of the disclosure is not so limited. In other implementations, one or more additional processing devices may be present in a given processing device.

Processors 970 and 980 are shown including integrated memory controller units (IMCs) 972 and 982, respectively. Processing device 970 also includes as part of its bus controller units point-to-point (P-P) interfaces 976 and 978; similarly, second processing device 980 includes P-P interfaces 986 and 988. Processing devices 970, 980 may exchange information via a point-to-point (P-P) interface 950 using P-P interface circuits 978, 988. As shown in FIG. 9, IMCs 972 and 982 couple the processing devices to respective memories, namely a memory 932 and a memory 934, which may be portions of main memory locally attached to the respective processing devices.

Processors 970, 980 may each exchange information with a chipset 990 via individual P-P interfaces 952, 954 using point to point interface circuits 976, 994, 986, 998. Chipset 990 may also exchange information with a high-performance graphics circuit 938 via a high-performance graphics interface 992.

A shared cache (not shown) may be included in either processing device or outside of both processing devices, yet connected with the processing devices via P-P interconnect, such that either or both processing devices' local cache information may be stored in the shared cache if a processing device is placed into a low power mode.

Chipset 990 may be coupled to a first bus 916 via an interface 996. In one implementation, first bus 916 may be a Peripheral Component Interconnect (PCI) bus, or a bus such as a PCI Express bus or another third generation I/O interconnect bus, although the scope of the disclosure is not so limited.

As shown in FIG. 9, various I/O devices 914 may be coupled to first bus 916, along with a bus bridge 918 which couples first bus 916 to a second bus 920. In one implementation, second bus 920 may be a low pin count (LPC) bus. Various devices may be coupled to second bus 920 including, for example, a keyboard and/or mouse 922, communication devices 927 and a storage unit 928 such as a disk drive or other mass storage device which may include instructions/code and data 930, in one implementation. Further, an audio I/O 924 may be coupled to second bus 920. Note that other architectures are possible. For example, instead of the point-to-point architecture of FIG. 9, a system may implement a multi-drop bus or other such architecture.

Figure 10:
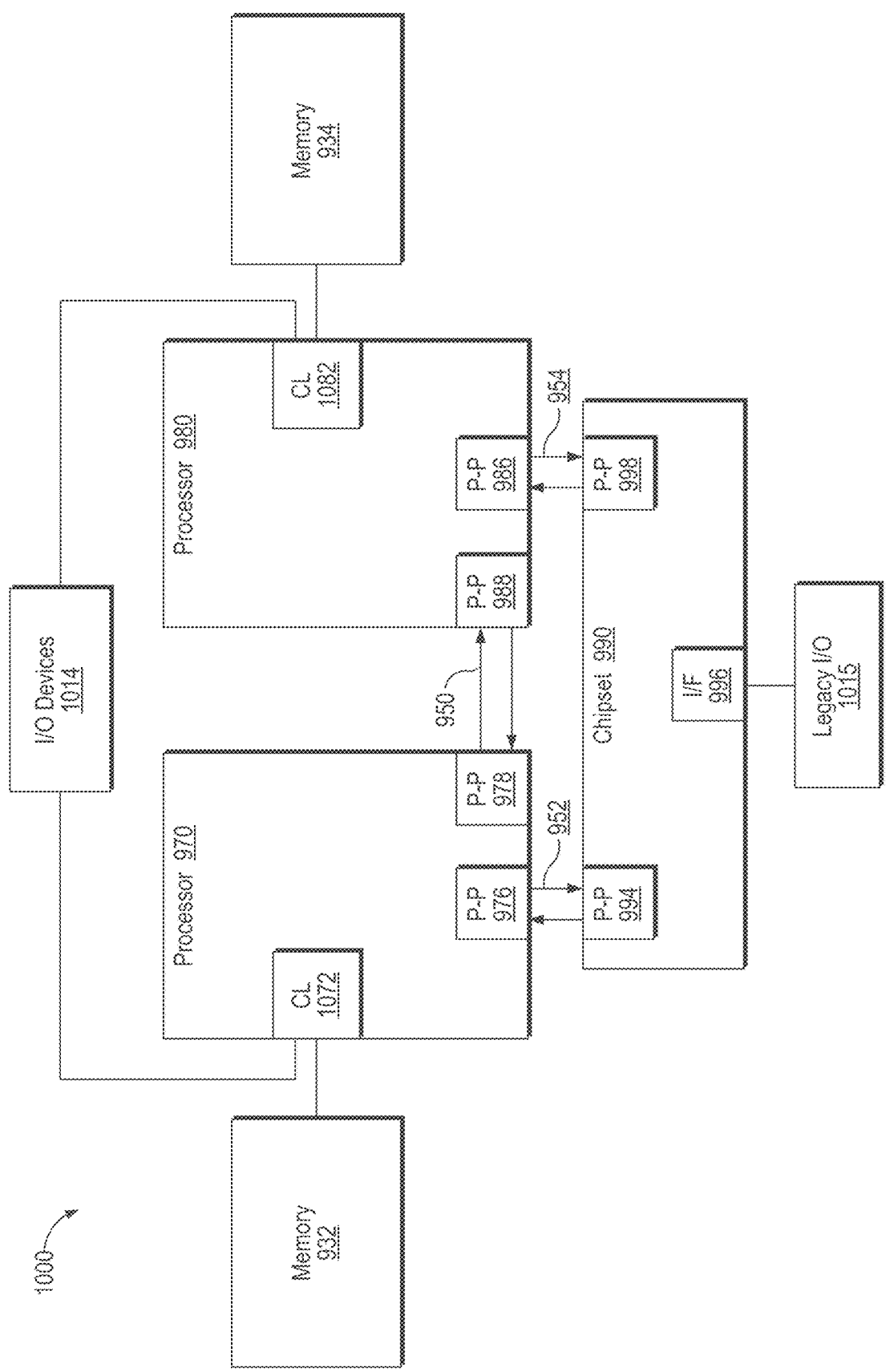
FIG. 10 is a block diagram of a computer system according to another implementation.

Referring now to FIG. 10, shown is a block diagram of a third system 1000 in accordance with an implementation of the disclosure. Like elements in FIGS. 9 and 10 bear like reference numerals, and certain aspects of FIG. 9 have been omitted from FIG. 10 in order to avoid obscuring other aspects of FIG. 10.

FIG. 10 illustrates processors 970, 980. In one embodiment, processors 970, 980 may implement hybrid cores. Processors 970, 980 may include integrated memory and I/O control logic ("CL") 1072 and 1082, respectively, and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one implementation, the CL 1072, 1082 may include IMCs 972, 982 as described herein. In addition, CL 1072, 1082 may also include I/O control logic. FIG. 10 illustrates that the memories 932, 934 are coupled to the CL 1072, 1082, and that I/O devices 1014 are also coupled to the CL 1072, 1082. Legacy I/O devices 1015 are coupled to the chipset 990 via interface 996. The implementations to enable dynamical switching between extended page tables and shadow page tables for runtime processor verification may be implemented in processing device 970, processing device 980, or both.

Figure 11:
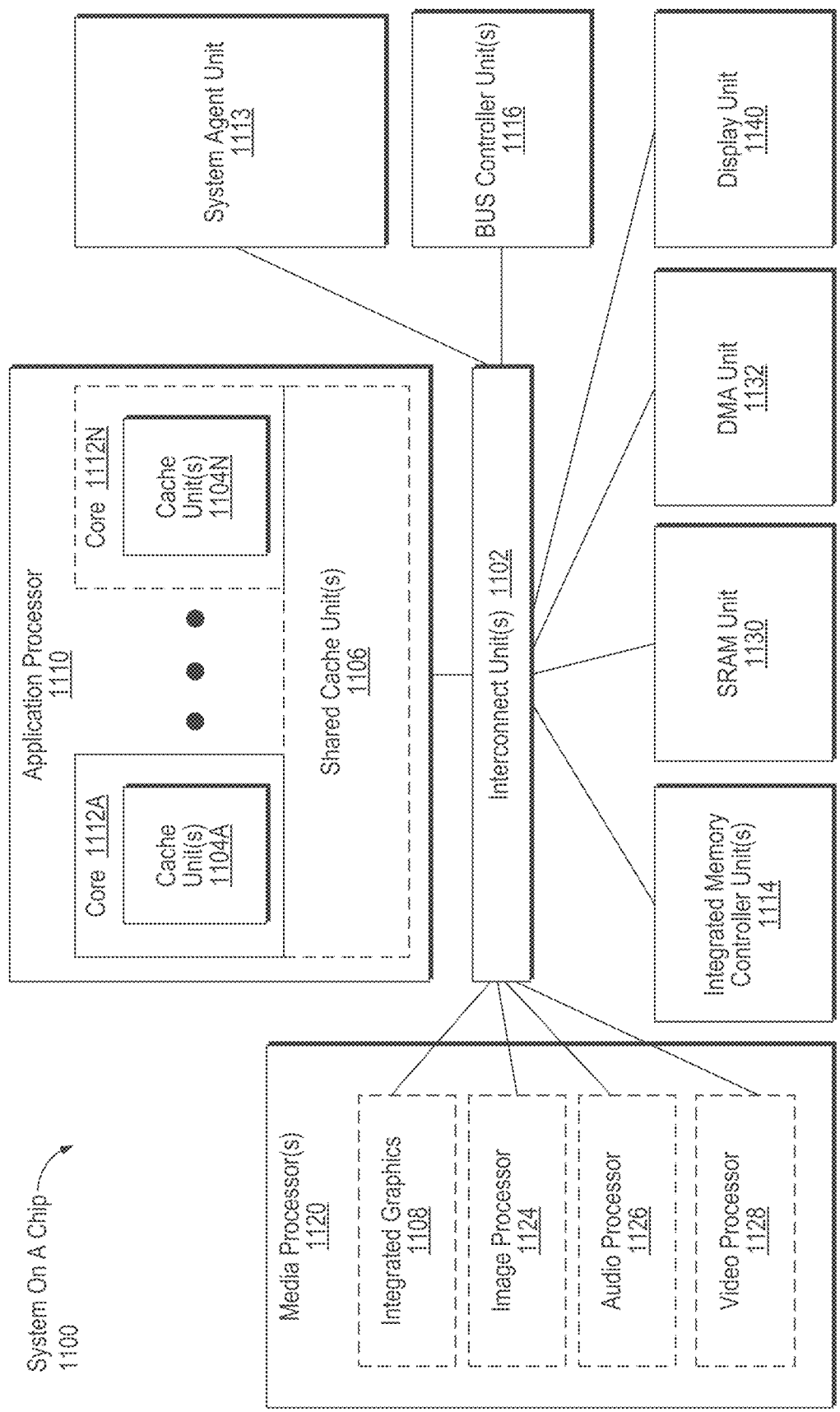
FIG. 11 is a block diagram of a system-on-a-chip according to one implementation.

FIG. 11 is an example system on a chip (SoC) 1100 that may include one or more of the cores 1112A . . . 1112N of the application processor 1110. Other system designs and configurations known in the arts for laptops, desktops, handheld PCs, personal digital assistants, engineering workstations, servers, network devices, network hubs, switches, embedded processing devices, digital signal processing devices (DSPs), graphics devices, video game devices, set-top boxes, micro controllers, cell phones, portable media players, hand held devices, and various other electronic devices, are also suitable. In general, a huge variety of systems or electronic devices capable of incorporating a processing device and/or other execution logic as disclosed herein are generally suitable.

Referring now to FIG. 11, shown is a block diagram of a SoC 1100 in accordance with an implementation of the disclosure. Also, dashed lined boxes are features on more advanced SoCs. In FIG. 11, an interconnect unit(s) 1102 is coupled to: the application processor 1110 which includes a set of one or more cores 1112A-N, containing one or more cache unit(s) 1104A . . . 1104N, respectively, and shared cache unit(s) 1106; a system agent unit 1113; a bus controller unit(s) 1116; an integrated memory controller unit(s) 1114; a set or one or more media processing devices 1120 which may include integrated graphics logic 1108, an image processing device 1124 for providing still and/or video camera functionality, an audio processing device 1126 for providing hardware audio acceleration, and a video processing device 1128 for providing video encode/decode acceleration; a static random access memory (SRAM) unit 1130; a direct memory access (DMA) unit 1132; and a display unit 1140 for coupling to one or more external displays. The implementations to enable dynamical switching between extended page tables and shadow page tables for runtime processor verification may be implemented in SoC 1100.

Figure 12:
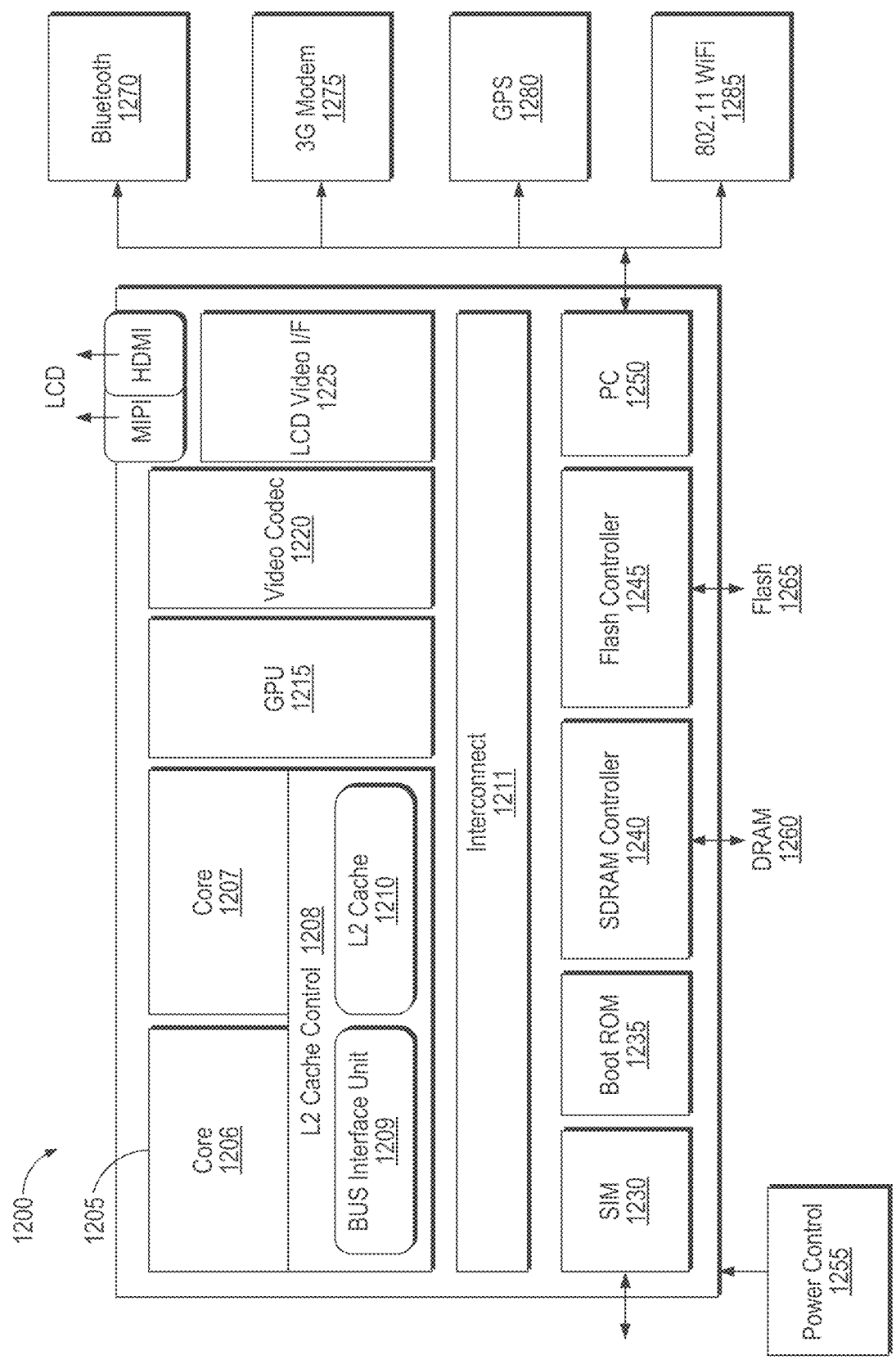
FIG. 12 illustrates another implementation of a block diagram for a computing system.

Turning next to FIG. 12, an implementation of an SoC design in accordance with implementations of the disclosure is depicted. As an illustrative example, SoC 1200 is included in user equipment (UE). In one implementation, UE refers to any device to be used by an end-user to communicate, such as a hand-held phone, smartphone, tablet, ultra-thin notebook, notebook with broadband adapter, or any other similar communication device. A UE may connect to a base station or node, which may correspond in nature to a mobile station (MS) in a GSM network. The implementations to enable dynamical switching between extended page tables and shadow page tables for runtime processor verification may be implemented in SoC 1200.

Here, SoC 1220 includes 2 cores-1206 and 1207. Similar to the discussion above, cores 1206 and 1207 may conform to an Instruction Set Architecture, such as a processing device having the Intel® Architecture Core™, an Advanced Micro Devices, Inc. (AMD) processing device, a MIPS-based processing device, an ARM-based processing device design, or a customer thereof, as well as their licensees or adopters. Cores 1206 and 1207 are coupled to cache control 1208 that is associated with bus interface unit 1209 and L2 cache 1210 to communicate with other parts of system 1200. Interconnect 1211 includes an on-chip interconnect, such as an IOSF, AMBA, or other interconnects discussed above, which may implement one or more aspects of the described disclosure.

Interconnect 1211 provides communication channels to the other components, such as a Subscriber Identity Module (SIM) 1230 to interface with a SIM card, a boot ROM 1235 to hold boot code for execution by cores 1206 and 1207 to initialize and boot SoC 1200, a SDRAM controller 1240 to interface with external memory (e.g. DRAM 1260), a flash controller 1245 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the implementations described herein.

In addition, the system illustrates peripherals for communication, such as a Bluetooth module 1270, 3G modem 1275, GPS 1280, and Wi-Fi 1285. Note as stated above, a UE includes a radio for communication. As a result, these peripheral communication modules may not all be included. However, in a UE some form of a radio for external communication should be included.

Figure 13:
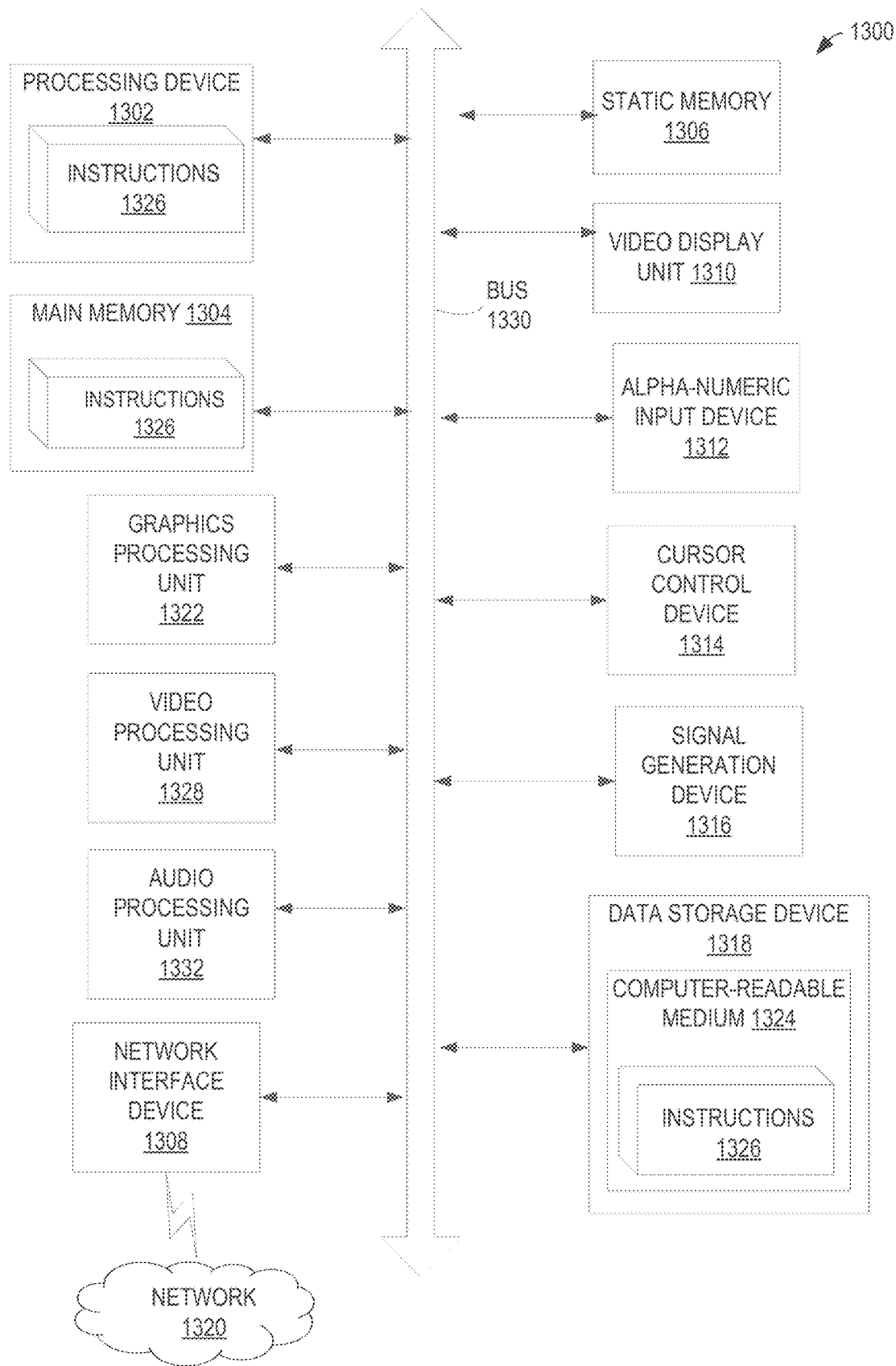
FIG. 13 illustrates another implementation of a block diagram for a computing system.

FIG. 13 illustrates a diagrammatic representation of a machine in the example form of a computing system 1300 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine.

Further, while only a single machine is illustrated, the term "machine" shall also be taken to include any collection of machines that individually or jointly execute a set (or multiple sets) of instructions to perform any one or more of the methodologies discussed herein. The implementations of the converting pages and sections may be implemented in computing system 1300.

The computing system 1300 includes a processing device 1302, main memory 1304 (e.g., read-only memory (ROM), flash memory, dynamic random access memory (DRAM) (such as synchronous DRAM (SDRAM) or DRAM (RDRAM), etc.), a static memory 1306 (e.g., flash memory, static random access memory (SRAM), etc.), and a data storage device 1318, which communicate with each other via a bus 1330.

Processing device 1302 represents one or more general-purpose processing devices such as a microprocessing device, central processing unit, or the like. More particularly, the processing device may be complex instruction set computing (CISC) microprocessing device, reduced instruction set computer (RISC) microprocessing device, very long instruction word (VLIW) microprocessing device, or processing device implementing other instruction sets, or processing devices implementing a combination of instruction sets. Processing device 1302 may also be one or more special-purpose processing devices such as an application specific integrated circuit (ASIC), a field programmable gate array (FPGA), a digital signal processing device (DSP), network processing device, or the like. In one implementation, processing device 1302 may include one or processing device cores. The processing device 1302 is configured to execute instructions 1326 for performing the operations discussed herein. In one implementation, processing device 1302 may be part of the computing system 100 of FIG. 1. Alternatively, the computing system 1300 may include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1300 may further include a network interface device 1308 communicably coupled to a network 1320. The computing system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), a signal generation device 1316 (e.g., a speaker), or other peripheral devices. Furthermore, computing system 1300 may include a graphics processing unit 1322, a video processing unit 1328 and an audio processing unit 1332. In another implementation, the computing system 1300 may include a chipset (not illustrated), which refers to a group of integrated circuits, or chips, that are designed to work with the processing device 1302 and controls communications between the processing device 1302 and external devices. For example, the chipset may be a set of chips on a motherboard that links the processing device 1302 to very high-speed devices, such as main memory 1304 and graphic controllers, as well as linking the processing device 1302 to lower-speed peripheral buses of peripherals, such as USB, PCI or ISA buses.

The data storage device 1318 may include a computer-readable storage medium 1324 on which is stored instructions 1326 embodying any one or more of the methodologies of functions described herein. The instructions 1326 may also reside, completely or at least partially, within the main memory 1304 as instructions 1326 and/or within the processing device 1302 as processing logic during execution thereof by the computing system 1300; the main memory 1304 and the processing device 1302 also constituting computer-readable storage media.

The computer-readable storage medium 1324 may also be used to store instructions 1326 utilizing the processing device 1302, such as described with respect to FIG. 1, and/or a software library containing methods that call the above applications. While the computer-readable storage medium 1324 is shown in an example implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the implementations. The term "computer-readable storage medium" shall accordingly be taken to include, but not be limited to, solid-state memories, and optical and magnetic media.

The following examples pertain to further implementations.

Example 1 is a system comprising a processor to execute a virtual machine, wherein the processor is to 1) receive a request to access a memory page identified by a guest virtual memory address (GVA) in an address space of the virtual machine, 2) translate the GVA to a guest physical memory address (GPA) using a guest page table (GPT) comprising a GPT entry mapping the GVA to the GPA, 5) translate the GPA to a host physical address (HPA) of the memory page, 4) store, in a translation lookaside buffer (TLB), a TLB entry mapping the GVA to the HPA, 6) modify the GPT entry to designate the memory page as accessed, 7) detect an attempt by an application to modify the GPT entry, 8) generate, in response to the attempt to modify the GPT entry, a page fault, and 9) flush, in response to the page fault, the TLB entry.

In Example 2, the system of Example 1, wherein to generate the page fault the processor is to 1) operate in a shadow page table memory access mode (SPT-mode), wherein the SPT-mode comprises maintaining a shadow page table (SPT) comprising an SPT entry mapping the GVA to the HPA, 2) designate, in the SPT, a GPT memory page as write-protected, wherein the GPT memory page is to store the GPT entry, 3) receive an instruction from the application to modify the GPT entry, 4) determine, using the SPT, that the GPT memory page is write-protected, and 5) generate the page fault in response to determining that the GPT memory page is write-protected.

In Example 3, the system of Example 2, wherein to operate in the SPT-mode the processor is to transition to the SPT-mode from an extended page table memory access mode (EPT-mode), wherein in the EPT-mode translating the GVA to the HPA further comprises translating the GPA to the HPA using an extended page table (EPT) comprising an EPT entry mapping the GPA to the HPA.

In Example 4, the system of Example 2, wherein creating the SPT comprises 1) selecting a plurality of base GVAs for a processor state of a virtual processor, 2) selecting a plurality of GVAs that are adjacent to the base GVAs, 3) selecting a predetermined number of hot-access GVAs, and 4) populating the SPT with the plurality of base GVAs for the processor state of the virtual processor, the plurality of GVAs that are adjacent to the base GVAs, and the selected hot-access GVAs.

In Example 5, the system of Example 1, wherein the processor is to transition from an extended page table memory access mode (EPT-mode) to a shadow page table memory access mode (SPT-mode), wherein in the EPT-mode translating the GVA to the HPA comprises translating the GPA to the HPA using an extended page table (EPT) comprising an EPT entry mapping the GPA to the HPA, and wherein in the SPT-mode translating the GVA to the HPA comprises maintaining a shadow page table (SPT) comprising an SPT entry mapping the GVA to the HPA; and where the processor further comprises a replay co-processor (RCP) to 1) copy, at a start of a verification time interval, a processor state of a virtual processor enabled by the processor, wherein the virtual processor is assigned to execute a software program, 2) replay the copied processor state of the virtual processor on the RCP, and 3) compare a resulting processor state of the RCP with a processor state of the virtual processor at an end of the verification time interval.

In Example 6, the system of Example 5, wherein the processor state of the virtual processor at the start of the verification time interval comprises 1) content of a plurality of hardware registers of the processor and 2) content of a plurality of memory pages associated with the software program.

In Example 7, the system of Example 5, wherein to transition from the EPT-mode to the SPT-mode the processing device is to 1) stop processes being executed by the virtual processor, 2) clear cached EPT-related hardware registers, 3) configure a virtual machine control structure (VMCS) to disable the EPT, 4) configure the VMCS to enable the SPT, 5) create the SPT, and 6) resume execution of the stopped processes on the virtual processor.

In Example 8, the system of Example 5, wherein after the end of the verification time interval the processing device is to 1) stop processes being executed by the virtual processor 2) clear cached SPT-related hardware registers, 3) configure a virtual machine control structure (VMCS) to disable the SPT, 4) configure the VMCS to enable the EPT, 5) load a most recent EPT, and 6) resume execution of the stopped processes on the virtual processor.

In Example 9, a system comprising 1) a processor to initialize a virtual machine monitor (VMM), wherein the VMM is to initialize a guest operating system (GOS), wherein the GOS is to support a virtual machine, 2) a memory device to store a) a guest page table (GPT) comprising a GPT entry to map a guest virtual memory address (GVA) to a guest physical memory address (GPA), b) an extended page table (EPT) comprising an EPT entry to map the GPA to a host physical memory address (HPA), and c) a shadow page table (SPT) comprising an SPT entry to map the GVA to the HPA, 3) a replay co-processor (RCP), and 4) a processor checking module (PCM) to enable runtime verification of the processor on the RCP.

In Example 10, the system of Example 9, wherein the processor is capable of both an EPT-enabled memory access mode (EPT-mode) and an SPT-enabled memory access mode (SPT-mode), wherein in the EPT-mode the processor is to 1) receive a request to access a memory page identified by the GVA, 2) perform a first walk in the GPT to obtain the GPA from the GVA, and 3) perform a second walk in the EPT to obtain the HPA of the memory page from the GPA, and wherein in the SPT-mode the processor is to 1) receive a request to access the memory page identified by the GVA, 2) perform a third page walk in the SPT to obtain a memory translation from the GVA to a host physical address (HPA) of the memory page, 3) store, in a translation lookaside buffer (TLB) of the processor, a translation entry corresponding to the memory translation, 4) modify the GVA to designate the memory page as accessed, 5) detect an attempt by an application to modify the GPT entry; generate, in response to the attempt to modify the GPT entry, a page fault, and 6) flush, in response to the page fault, the translation entry from the TLB.

In Example 11, the system of Example 10, wherein to modify the GVA to designate the memory page as accessed is to set an A-bit in an SPT entry corresponding to the memory translation from the GVA to the HPA.

In Example 12, the system of Example 10, wherein the processor is periodically to 1) transition from the EPT-mode to the SPT-mode, and 2) transition back from the SPT-mode to the EPT-mode.

Various implementations may have different combinations of the structural features described above. For instance, all optional features of the processors and methods described above may also be implemented with respect to a system described herein and specifics in the examples may be used anywhere in one or more implementations.

Example 13 is a method comprising 1) running, by a processing device, a virtual machine, 2) receiving, by the processing device, a request to access a memory page identified by a guest virtual memory address (GVA) in an address space of the virtual machine, 3) translating the GVA to a guest physical memory address (GPA) using a guest page table (GPT) comprising a GPT entry mapping the GVA to the GPA, 3) translating the GPA to a host physical address (HPA) of the memory page, 4) storing, by the processing device, in a translation lookaside buffer (TLB), a TLB entry mapping the GVA to the HPA, 4) modifying, by the processing device, the GPT entry to designate the memory page as accessed, 5) detecting, by the processing device, an attempt by an application to modify the GPT entry, 6) generating, by the processing device, in response to the attempt to modify the GPT entry, a page fault, and 7) flushing, by the processing device, in response to the page fault, the TLB entry.

In Example 14, the method of Example 13, wherein generating the page fault comprises, 1) operating the processing device in a shadow page table memory access mode (SPT-mode), wherein the SPT-mode comprises maintaining a shadow page table (SPT) comprising an SPT entry mapping the GVA to the HPA, 2) designating, in the SPT, a GPT memory page as write-protected, wherein the GPT memory page is to store the GPT entry, 3) receiving an instruction from the application to modify the GPT entry, 4) determining, using the SPT, that the GPT memory page is write-protected, and 5) generating the page fault in response to determining that the GPT memory page is write-protected.

In Example 15, the method of Example 14, wherein to operate the processing device in the SPT-mode, the processing device is to transition to the SPT-mode from an extended page table memory access mode (EPT-mode), wherein in the EPT-mode translating the GVA to the HPA further comprises translating the GPA to the HPA using an extended page table (EPT) comprising an EPT entry mapping the GPA to the HPA.

In Example 16, the method of Example 14, wherein creating the SPT comprises 1) selecting, by the processing device, a plurality of base GVAs for a processor state of a virtual processor, 2) selecting, by the processing device, a plurality of GVAs that are adjacent to the base GVAs, 3) selecting, by the processing device, a predetermined number of hot-access GVAs, and 4) populating, by the processing device, the SPT with the plurality of base GVAs for the processor state of the virtual processor, the plurality of GVAs that are adjacent to the base GVAs, and the selected hot-access GVAs.

In Example 17, the method of Example 13, further comprising transitioning the processing device from an extended page table memory access mode (EPT-mode) to a shadow page table memory access mode (SPT-mode), wherein in the EPT-mode translating the GVA to the HPA comprises translating the GPA to the HPA using an extended page table (EPT) comprising an EPT entry mapping the GPA to the HPA, and wherein in the SPT-mode translating the GVA to the HPA comprises using a shadow page table (SPT) comprising an SPT entry mapping the GVA to the HPA, and wherein the method further comprises 1) copying, by the processing device, at a start of a verification time interval, a processor state of a virtual processor of the processing device, wherein the virtual processor is assigned to execute a software program, 2) replaying, by the processing device, the copied processor state of the virtual processor on a replay co-processor (RCP), and 3) comparing, by the processing device, a resulting processor state of the RCP with a processor state of the virtual processor at an end of the verification time interval.

In Example 18, the method of Example 17, wherein the processor state of the virtual processor at the start of the verification time interval comprises 1) content of a plurality of hardware registers of the processor, and 2) content of a plurality of memory pages associated with the software program.

In Example 19, the method of Example 17, wherein transitioning from the EPT-mode to the SPT-mode comprises 1) stopping, by the processing device, processes being executed by the virtual processor, 2) clearing, by the processing device, cached EPT-related hardware registers, 3) configuring, by the processing device, a virtual machine control structure (VMCS) to disable the EPT, 4) configuring, by the processing device, the VMCS to enable the SPT, 5) creating, by the processing device, the SPT, and 6) resuming by the processing device, execution of the stopped processes on the virtual processor.

In Example 20, the method of Example 17, further comprising, after the end of the verification time interval 1) stopping, by the processing device, processes being executed by the virtual processor, 2) clearing, by the processing device, cached SPT-related hardware registers, 3) configuring, by the processing device, a virtual machine control structure (VMCS) to disable the SPT, 4) configuring, by the processing device, the VMCS to enable the EPT, 5) loading, by the processing device, a most recent EPT, and 6) resuming, by the processing device, execution of the stopped processes on the virtual processor.

Various implementations may have different combinations of the structural features described above. For instance, all optional features of the processors and methods described above may also be implemented with respect to a system described herein and specifics in the examples may be used anywhere in one or more implementations.

Example 21 is a non-transitory computer-readable medium storing instructions, which when executed by a processor having a core coupled to a system memory, cause the processor to execute a plurality of logic operations comprising 1) running, by a processing device, a virtual machine, 2) receiving, by the processing device, a request to access a memory page identified by a guest virtual memory address (GVA) in an address space of the virtual machine, 3) translating the GVA to a guest physical memory address (GPA) using a guest page table (GPT) comprising a GPT entry mapping the GVA to the GPA, 3) translating the GPA to a host physical address (HPA) of the memory page, 4) storing, by the processing device, in a translation lookaside buffer (TLB), a TLB entry mapping the GVA to the HPA, 5) modifying, by the processing device, the GPT entry to designate the memory page as accessed, 6) detecting, by the processing device, an attempt by an application to modify the GPT entry, 7) generating, by the processing device, in response to the attempt to modify the GPT entry, a page fault, and 8) flushing, by the processing device, in response to the page fault, the TLB entry.

In Example 22, the non-transitory computer-readable medium of Example 21, wherein generating the page fault comprises, 1) operating the processing device in a shadow page table memory access mode (SPT-mode), wherein the SPT-mode comprises maintaining a shadow page table (SPT) comprising an SPT entry mapping the GVA to the HPA, 2) designating, in the SPT, a GPT memory page as write-protected, wherein the GPT memory page is to store the GPT entry, 3) receiving an instruction from the application to modify the GPT entry, 4) determining, using the SPT, that the GPT memory page is write-protected, and 5) generating the page fault in response to determining that the GPT memory page is write-protected.

In Example 23, the non-transitory computer-readable medium of Example 22, wherein to operate the processing device in the SPT-mode, the instructions are to cause the processing device to transition to the SPT-mode from an extended page table memory access mode (EPT-mode), wherein in the EPT-mode translating the GVA to the HPA further comprises translating the GPA to the HPA using an extended page table (EPT) comprising an EPT entry mapping the GPA to the HPA.

In Example 24, the non-transitory computer-readable medium of Example 22, wherein to create the SPT the operations further comprise 1) selecting, by the processing device, a plurality of base GVAs for a processor state of a virtual processor, 2) selecting, by the processing device, a plurality of GVAs that are adjacent to the base GVAs, 3) selecting, by the processing device, a predetermined number of hot-access GVAs, and 4) populating, by the processing device, the SPT with the plurality of base GVAs for the processor state of the virtual processor, the plurality of GVAs that are adjacent to the base GVAs, and the selected hot-access GVAs.

In Example 25, the non-transitory computer-readable medium of Example 21, wherein the operations further comprise transitioning the processing device from an extended page table memory access mode (EPT-mode) to a shadow page table memory access mode (SPT-mode), wherein in the EPT-mode translating the GVA to the HPA comprises translating the GPA to the HPA using an extended page table (EPT) comprising an EPT entry mapping the GPA to the HPA, and wherein in the SPT-mode translating the GVA to the HPA comprises using a shadow page table (SPT) comprising an SPT entry mapping the GVA to the HPA, and wherein the non-transitory computer-readable medium further comprises 1) copying, by the processing device, at a start of a verification time interval, a processor state of a virtual processor of the processing device, wherein the virtual processor is assigned to execute a software program, 2) replaying, by the processing device, the copied processor state of the virtual processor on a replay co-processor (RCP), and 3) comparing, by the processing device, a resulting processor state of the RCP with a processor state of the virtual processor at an end of the verification time interval.

In Example 26, the non-transitory computer-readable medium of Example 25, wherein the processor state of the virtual processor at the start of the verification time interval comprises 1) content of a plurality of hardware registers of the processor, and 2) content of a plurality of memory pages associated with the software program.

In Example 27, the non-transitory computer-readable medium of Example 25, wherein transitioning from the EPT-mode to the SPT-mode comprises 1) stopping, by the processing device, processes being executed by the virtual processor, 2) clearing, by the processing device, cached EPT-related hardware registers, 3) configuring, by the processing device, a virtual machine control structure (VMCS) to disable the EPT, 4) configuring, by the processing device, the VMCS to enable the SPT, 5) creating, by the processing device, the SPT, and 6) resuming by the processing device, execution of the stopped processes on the virtual processor.

In Example 28, the non-transitory computer-readable medium of Example 25, wherein the operations further comprise, after the end of the verification time interval, 1) stopping, by the processing device, processes being executed by the virtual processor, 2) clearing, by the processing device, cached SPT-related hardware registers, 3) configuring, by the processing device, a virtual machine control structure (VMCS) to disable the SPT, 4) configuring, by the processing device, the VMCS to enable the EPT, 5) loading, by the processing device, a most recent EPT, and 6) resuming, by the processing device, execution of the stopped processes on the virtual processor.

Various implementations may have different combinations of the structural features described above. For instance, all optional features of the processors and methods described above may also be implemented with respect to a system described herein and specifics in the examples may be used anywhere in one or more implementations.

Example 29 is a system comprising 1) means for running, by a processing device, a virtual machine, 2) means for receiving, by the processing device, a request to access a memory page identified by a guest virtual memory address (GVA) in an address space of the virtual machine, 3) means for translating the GVA to a guest physical memory address (GPA) using a guest page table (GPT) comprising a GPT entry mapping the GVA to the GPA, 3) means for translating the GPA to a host physical address (HPA) of the memory page, 4) means for storing, by the processing device, in a translation lookaside buffer (TLB), a TLB entry mapping the GVA to the HPA, 4) means for modifying, by the processing device, the GPT entry to designate the memory page as accessed, 5) means for detecting, by the processing device, an attempt by an application to modify the GPT entry, 6) means for generating, by the processing device, in response to the attempt to modify the GPT entry, a page fault, and 7) means for flushing, by the processing device, in response to the page fault, the TLB entry.

In Example 30, the system of Example 29, wherein the means for generating the page fault comprise 1) means for operating the processing device in a shadow page table memory access mode (SPT-mode), wherein the SPT-mode comprises maintaining a shadow page table (SPT) comprising an SPT entry mapping the GVA to the HPA, 2) means for designating, in the SPT, a GPT memory page as write-protected, wherein the GPT memory page is to store the GPT entry, 3) means for receiving an instruction from the application to modify the GPT entry, 4) means for determining, using the SPT, that the GPT memory page is write-protected, and 5) means for generating the page fault in response to determining that the GPT memory page is write-protected.

In Example 31, the system of Example 30, wherein to operate the processing device in the SPT-mode, the processing device is to have means to transition to the SPT-mode from an extended page table memory access mode (EPT-mode), wherein in the EPT-mode translating the GVA to the HPA further comprises means for translating the GPA to the HPA using an extended page table (EPT) comprising an EPT entry mapping the GPA to the HPA.

In Example 32, the system of Example 30, wherein the means for creating the SPT comprise 1) means for selecting, by the processing device, a plurality of base GVAs for a processor state of a virtual processor, 2) means for selecting, by the processing device, a plurality of GVAs that are adjacent to the base GVAs, 3) means for selecting, by the processing device, a predetermined number of hot-access GVAs, and 4) means for populating, by the processing device, the SPT with the plurality of base GVAs for the processor state of the virtual processor, the plurality of GVAs that are adjacent to the base GVAs, and the selected hot-access GVAs.

In Example 33, the system of Example 29, further comprising means for transitioning the processing device from an extended page table memory access mode (EPT-mode) to a shadow page table memory access mode (SPT-mode), wherein in the EPT-mode translating the GVA to the HPA comprises having means to translate the GPA to the HPA using an extended page table (EPT) comprising an EPT entry mapping the GPA to the HPA, and wherein in the SPT-mode translating the GVA to the HPA comprises having means to use a shadow page table (SPT) comprising an SPT entry mapping the GVA to the HPA, and wherein the system further comprises 1) means for copying, by the processing device, at a start of a verification time interval, a processor state of a virtual processor of the processing device, wherein the virtual processor is assigned to execute a software program, 2) means for replaying, by the processing device, the copied processor state of the virtual processor on a replay co-processor (RCP), and 3) means for comparing, by the processing device, a resulting processor state of the RCP with a processor state of the virtual processor at an end of the verification time interval.

In Example 34, the system of Example 33, wherein the processor state of the virtual processor at the start of the verification time interval comprises 1) content of a plurality of hardware registers of the processor, and 2) content of a plurality of memory pages associated with the software program.

In Example 35, the system of Example 33, wherein the means for transitioning from the EPT-mode to the SPT-mode comprise 1) means for stopping, by the processing device, processes being executed by the virtual processor, 2) means for clearing, by the processing device, cached EPT-related hardware registers, 3) means for configuring, by the processing device, a virtual machine control structure (VMCS) to disable the EPT, 4) means for configuring, by the processing device, the VMCS to enable the SPT, 5) means for creating, by the processing device, the SPT, and 6) means for resuming by the processing device, execution of the stopped processes on the virtual processor.

In Example 36, the system of Example 33, further comprising using, after the end of the verification time interval, 1) means for stopping, by the processing device, processes being executed by the virtual processor, 2) means for clearing, by the processing device, cached SPT-related hardware registers, 3) means for configuring, by the processing device, a virtual machine control structure (VMCS) to disable the SPT, 4) means or configuring, by the processing device, the VMCS to enable the EPT, 5) means for loading, by the processing device, a most recent EPT, and 6) means for resuming, by the processing device, execution of the stopped processes on the virtual processor.

While the disclosure has been described with respect to a limited number of implementations, those skilled in the art will appreciate numerous modifications and variations therefrom. It is intended that the appended claims cover all such modifications and variations as fall within the true spirit and scope of this disclosure.

In the description herein, numerous specific details are set forth, such as examples of specific types of processing devices and system configurations, specific hardware structures, specific architectural and micro architectural details, specific register configurations, specific instruction types, specific system components, specific measurements/heights, specific processing device pipeline stages and operation etc. in order to provide a thorough understanding of the disclosure. It will be apparent, however, to one skilled in the art that these specific details need not be employed to practice the disclosure. In other instances, well known components or methods, such as specific and alternative processing device architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the disclosure.

The implementations are described with reference to enabling dynamical switching between extended page tables and shadow page tables for runtime processor verification, such as in computing platforms or microprocessing devices. The implementations may also be applicable to other types of integrated circuits and programmable logic devices. For example, the disclosed implementations are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processing device (DSP), a system on a chip, network computers (NetPC), set-top boxes, network hubs, wide area network (WAN) switches, or any other system that may perform the functions and operations taught below. It is described that the system may be any kind of computer or embedded system. The disclosed implementations may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the implementations of methods, apparatuses, and systems described herein (whether in reference to hardware, firmware, software, or a combination thereof) are vital to a 'green technology' future balanced with performance considerations.

Although the implementations herein are described with reference to a processing device, other implementations are applicable to other types of integrated circuits and logic devices. Similar techniques and teachings of implementations of the disclosure may be applied to other types of circuits or semiconductor devices that may benefit from higher pipeline throughput and improved performance. The teachings of implementations of the disclosure are applicable to any processing device or machine that performs data manipulations. However, the disclosure is not limited to processing devices or machines that perform 512 bit, 256 bit, 128 bit, 64 bit, 32 bit, or 16 bit data operations and may be applied to any processing device and machine in which manipulation or management of data is performed. In addition, the description herein provides examples, and the accompanying drawings show various examples for the purposes of illustration. However, these examples should not be construed in a limiting sense as they are merely intended to provide examples of implementations of the disclosure rather than to provide an exhaustive list of all possible implementations of implementations of the disclosure.

Although the below examples describe instruction handling and distribution in the context of execution units and logic circuits, other implementations of the disclosure may be accomplished by way of a data or instructions stored on a machine-readable, tangible medium, which when performed by a machine cause the machine to perform functions consistent with at least one implementation of the disclosure. In one implementation, functions associated with implementations of the disclosure are embodied in machine-executable instructions. The instructions may be used to cause a general-purpose or special-purpose processing device that is programmed with the instructions to perform the steps of the disclosure. Implementations of the disclosure may be provided as a computer program product or software which may include a machine or computer-readable medium having stored thereon instructions which may be used to program a computer (or other electronic devices) to perform one or more operations according to implementations of the disclosure. Alternatively, operations of implementations of the disclosure might be performed by specific hardware components that contain fixed-function logic for performing the operations, or by any combination of programmed computer components and fixed-function hardware components.

Instructions used to program logic to perform implementations of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of implementations of the disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one implementation, refers to the hardware, which is specifically configured to recognize and/or execute the code to be held on a non-transitory medium. Furthermore, in another implementation, use of a module refers to the non-transitory medium including the code, which is specifically adapted to be executed by the microcontroller to perform predetermined operations. And as may be inferred, in yet another implementation, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one implementation, use of the term logic includes hardware, such as transistors, registers, or other hardware, such as programmable logic devices.

Use of the phrase 'configured to,' in one implementation, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one implementation, refers to some apparatus, logic, hardware, and/or element designed in such a way to enable use of the apparatus, logic, hardware, and/or element in a specified manner. Note as above that use of to, capable to, or operable to, in one implementation, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one implementation, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one implementation, refer to a default and an updated value or state, respectively. For example, a default value potentially includes a high logical value, i.e. reset, while an updated value potentially includes a low logical value, i.e. set. Note that any combination of values may be utilized to represent any number of states.

The implementations of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from. Instructions used to program logic to perform implementations of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A system comprising:
    a replay co-processor; and
    a processor coupled to the replay co-processor, the processor to execute a virtual machine, the virtual machine including instructions that, upon execution, cause the processor to:
        operate in an extended page table memory access mode (EPT-mode);
        transition, prior to beginning a verification time window during which the replay co-processor samples a state of the virtual machine, from operating in the EPT-mode to operating in a shadow page table memory access mode (SPT-mode),
        operate in the SPT-mode during the verification time window; and
        transition, after an end of the verification time window, from operating in the SPT-mode to operating in the EPT-mode.

2. The system of claim 1, further comprising a memory coupled to the processor and the replay co-processor, the memory comprising a guest page table (GPT), an extended page table (EPT), and a shadow page table (SPT).

3. The system of claim 2, wherein transitioning to operating in the SPT-mode comprises pre-populating the SPT.

4. The system of claim 3, wherein pre-populating the SPT comprises:
    selecting one or more guest virtual addresses (GVAs) from a plurality of GVAs comprising a plurality of base GVAs for a processor state of a virtual processor associated with the virtual machine, a plurality of GVAs that are adjacent to the base GVAs and a plurality of frequently accessed GVAs; and
    populating the SPT with the selected GVAs.

5. The system of claim 2, wherein operating in the SPT-mode comprises:
   modifying a GPT entry to designate a corresponding memory page as accessed;
   detecting an attempt by an application to modify the GPT entry;
   generating, in response to the attempt to modify the GPT entry, a page fault; and
   flushing, in response to the page fault, an associated entry in a translation lookaside buffer (TLB) of the processor.

6. The system of claim 5, further comprising detecting, prior to generating the page fault, that the GPT entry is write-protected.

7. The system of claim 1, further comprising a processor checking module implemented by the processor, the processor checking module to enable runtime verification of the processor on the replay co-processor.

8. A computer-implemented method comprising:
   operating a virtual machine executing on a processor in an extended page table memory access mode (EPT-mode);
   transitioning, prior to beginning a verification time window during which a replay co-processor samples a state of the virtual machine, the virtual machine from operating in the EPT-mode to operating in a shadow page table memory access mode (SPT-mode);
   operating the virtual machine in the SPT-mode during the verification time window; and
   transitioning, after an end of the verification time window, the virtual machine from operating in the SPT-mode to operating in the EPT-mode.

9. The computer-implemented method of claim 8, wherein a memory coupled to the processor and the replay co-processor comprises a guest page table (GPT), an extended page table (EPT), and a shadow page table (SPT).

10. The computer-implemented method of claim 9, wherein transitioning to operating in the SPT-mode comprises pre-populating the SPT.

11. The computer-implemented method of claim 10, wherein pre-populating the SPT comprises:
    selecting one or more guest virtual addresses (GVAs) from a plurality of GVAs comprising a plurality of base GVAs for a processor state of a virtual processor associated with the virtual machine, a plurality of GVAs that are adjacent to the base GVAs and a plurality of frequently accessed GVAs; and
    populating the SPT with the selected GVAs.

12. The computer-implemented method of claim 9, wherein operating in the SPT-mode comprises:
    modifying a GPT entry to designate a corresponding memory page as accessed;
    detecting an attempt by an application to modify the GPT entry;
    generating, in response to the attempt to modify the GPT entry, a page fault; and
    flushing, in response to the page fault, an associated entry in a translation lookaside buffer (TLB) of the processor.

13. The computer-implemented method of claim 12, further comprising detecting, prior to generating the page fault, that the GPT entry is write-protected.

14. The computer-implemented method of claim 8, further comprising performing runtime verification of the processor on the replay co-processor.

15. A non-transitory computer-readable storage medium storing instructions, that when executed by a processor, cause the processor to:
    operate a virtual machine executing on the processor in an extended page table memory access mode (EPT-mode);
    transition, prior to beginning a verification time window during which a replay co-processor samples a state of the virtual machine, the virtual machine from operating in the EPT-mode to operating in a shadow page table memory access mode (SPT-mode);
    operate the virtual machine in the SPT-mode during the verification time window; and
    transition, after an end of the verification time window, the virtual machine from operating in the SPT-mode to operating in the EPT-mode.

16. The computer-readable storage medium of claim 15, wherein a memory coupled to the processor and the replay co-processor comprises a guest page table (GPT), an extended page table (EPT), and a shadow page table (SPT).

17. The computer-readable storage medium of claim 16, wherein transitioning to operating in the SPT-mode comprises pre-populating the SPT.

18. The computer-readable storage medium of claim 17, wherein pre-populating the SPT comprises:
    selecting one or more guest virtual addresses (GVAs) from a plurality of GVAs comprising a plurality of base GVAs for a processor state of a virtual processor associated with the virtual machine, a plurality of GVAs that are adjacent to the base GVAs and a plurality of frequently accessed GVAs; and
    populating the SPT with the selected GVAs.

19. The computer-readable storage medium of claim 16, wherein operating in the SPT-mode comprises:
    modifying a GPT entry to designate a corresponding memory page as accessed;
    detecting an attempt by an application to modify the GPT entry;
    generating, in response to the attempt to modify the GPT entry, a page fault; and
    flushing, in response to the page fault, an associated entry in a translation lookaside buffer (TLB) of the processor.

20. The computer-readable storage medium of claim 15, further comprising performing runtime verification of the processor on the replay co-processor.

* * * * *